US008909883B2

(12) United States Patent
Mizuno et al.

(10) Patent No.: US 8,909,883 B2
(45) Date of Patent: Dec. 9, 2014

(54) STORAGE SYSTEM AND STORAGE CONTROL METHOD

(75) Inventors: Yoichi Mizuno, Yokohama (JP); Noboru Morishita, Yokohama (JP); Tadato Nishina, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 152 days.

(21) Appl. No.: 13/133,618

(22) PCT Filed: May 31, 2011

(86) PCT No.: PCT/JP2011/003068
§ 371 (c)(1),
(2), (4) Date: Jun. 8, 2011

(87) PCT Pub. No.: WO2012/164618
PCT Pub. Date: Dec. 6, 2012

(65) Prior Publication Data
US 2012/0311261 A1     Dec. 6, 2012

(51) Int. Cl.
G06F 12/00 (2006.01)
G06F 13/00 (2006.01)
G06F 13/28 (2006.01)
G06F 3/06 (2006.01)
G06F 11/14 (2006.01)

(52) U.S. Cl.
CPC ............... *G06F 3/065* (2013.01); *G06F 3/067* (2013.01); *G06F 2201/84* (2013.01); *G06F 11/1466* (2013.01); *G06F 11/1458* (2013.01); *G06F 3/0689* (2013.01); *G06F 3/0611* (2013.01)
USPC ........... 711/162; 707/639; 707/640; 707/657; 711/112; 711/113; 711/114; 711/154; 711/161; 711/163; 711/165; 714/42

(58) Field of Classification Search
USPC .................................................. 711/117, 118
See application file for complete search history.

(56) References Cited

U.S. PATENT DOCUMENTS 6,301,643 B1 * 10/2001 Crockett et al. ............... 711/162
7,072,915 B2 * 7/2006 Kaczmarski et al. ................. 1/1
(Continued)

OTHER PUBLICATIONS

Definition of "logical", Free Online Dictionary of Computing (FOLDOC), retrieved from http://foldoc.org/logical (1 page).*

(Continued)

Primary Examiner — Sanjiv Shah
Assistant Examiner — Daniel C Chappell
(74) Attorney, Agent, or Firm — Mattingly & Malur, PC

(57) ABSTRACT

A storage system is provided with a memory region, a cache memory region, and a processor. The memory region stores the time relation information that indicates a time relationship of a data element that has been stored into the cache memory region and that is to be written to the logical region and a snapshot acquisition point of time to the primary volume. The processor judges whether or not the data element that has been stored into the cache memory region is a snapshot configuration element based on the time relation information for the data element that is to be written to a logical region of a write destination that conforms to the write request that specifies the primary volume and that has been stored into the cache memory region. In the case in which the result of the judgment is positive, the processor saves the data element to the secondary volume for holding a snapshot image in which the snapshot configuration element is a configuration element, and a data element of a write target is then stored into the cache memory region.

15 Claims, 31 Drawing Sheets

(56) References Cited

U.S. PATENT DOCUMENTS

| | | | |
|---|---|---|---|
| 7,100,089 B1* | 8/2006 | Phelps | 714/42 |
| 7,103,713 B2* | 9/2006 | Saika et al. | 711/112 |
| 7,239,581 B2* | 7/2007 | Delgado et al. | 368/10 |
| 7,243,116 B2* | 7/2007 | Suzuki et al. | 707/640 |
| 7,296,008 B2* | 11/2007 | Passerini et al. | 1/1 |
| 7,409,495 B1* | 8/2008 | Kekre et al. | 711/114 |
| 7,454,583 B2* | 11/2008 | Yagisawa et al. | 711/162 |
| 7,734,591 B1* | 6/2010 | Mercier et al. | 707/639 |
| 7,827,362 B2* | 11/2010 | Passerini | 711/154 |
| 7,941,406 B2* | 5/2011 | Sudhakar | 707/657 |
| 7,945,726 B2* | 5/2011 | Faibish et al. | 711/112 |
| 8,006,052 B1* | 8/2011 | Benhanokh et al. | 711/162 |
| 8,108,640 B1* | 1/2012 | Holl, II | 711/162 |
| 8,307,154 B2* | 11/2012 | Stabrawa et al. | 711/113 |
| 2004/0181639 A1* | 9/2004 | Jarvis et al. | 711/161 |
| 2004/0186968 A1* | 9/2004 | Factor et al. | 711/162 |
| 2004/0230757 A1* | 11/2004 | Brice et al. | 711/163 |
| 2004/0260735 A1* | 12/2004 | Martinez et al. | 707/204 |
| 2005/0210210 A1* | 9/2005 | Arai et al. | 711/162 |
| 2006/0031646 A1* | 2/2006 | Maruyama et al. | 711/162 |
| 2006/0143412 A1* | 6/2006 | Armangau | 711/162 |
| 2006/0168397 A1* | 7/2006 | Wightwick et al. | 711/114 |
| 2007/0113034 A1* | 5/2007 | Maruyama et al. | 711/162 |
| 2007/0156985 A1* | 7/2007 | Tsai et al. | 711/162 |
| 2008/0005146 A1* | 1/2008 | Kubo et al. | 707/102 |
| 2008/0104346 A1* | 5/2008 | Watanabe et al. | 711/162 |
| 2008/0270695 A1* | 10/2008 | Ninose | 711/114 |
| 2009/0055613 A1* | 2/2009 | Maki et al. | 711/165 |
| 2009/0150626 A1* | 6/2009 | Benhase et al. | 711/162 |
| 2009/0198929 A1* | 8/2009 | Saika | 711/162 |
| 2009/0228671 A1* | 9/2009 | Shigemura et al. | 711/162 |
| 2010/0070724 A1* | 3/2010 | Ito et al. | 711/162 |
| 2011/0225379 A1* | 9/2011 | Eguchi et al. | 711/162 |
| 2012/0117320 A1* | 5/2012 | Pinchover et al. | 711/112 |

OTHER PUBLICATIONS

Definition of "virtual", Free Online Dictionary of Computing (FOLDOC), retrieved from http://foldoc.org/virtual(1 page).*

ESnap—A Cached Dependent Snapshot System, Xie et al, IEEE International Conference on Integration Technology, 2007 (ICIT '07), Mar. 20-24, 2007, pp. 783-788 (6 pages).*

ESnapII: A Writable Dependent Snapshot System with Shared Cache, Xie et al, Ninth ACIS International Conference on Software Engineering, Artificial Intelligence, Networking, and Parallel/Distributed Computing, 2008 (SNPD '08), Jun. 6-8, 2008, pp. 677-682 (6 pages).*

* cited by examiner

Pair information management table 1171

| PVOL # | Latest generation # | Pair ID | SVOL# | Generation# | Status |
|---|---|---|---|---|---|
| 0 | 3 | 0 | 6 | 1 | Snapshot Held |
| | | 1 | 2 | 3 | Snapshot Held |
| | | 2 | 10 | 2 | Snapshot Held |
| | | 3 | 5 | - | Snapshot not Acquired |
| | | ... | | | |
| 1 | 15 | 0 | 3 | 3 | Under Restore |
| | | 1 | 4 | 11 | Snapshot Held |
| | | 2 | 15 | 8 | Snapshot Held |
| | | ... | | | |
| 2 | 0 | | | | |
| ... | ... | | | | |

Fig. 5

Difference region management table 1172

| PVOL# | Region ID | Save status | Restore status | CAW attribute | Generation # |
|---|---|---|---|---|---|
| 0 | 0 | Saved | - | - | - |
| | 1 | Unsaved | - | ON | 2 |
| | 2 | Unsaved | - | ON | 4 |
| | 3 | Unsaved | - | OFF | - |
| | ... | ... | | ... | ... |
| 1 | 0 | Saved | Done | - | - |
| | 1 | Unsaved | Undone | OFF | - |
| | 2 | Saved | Undone | - | - |
| | 3 | Unsaved | Undone | ON | 4 |
| | ... | ... | | | ... |
| ... | ... | ... | | | ... |

Fig. 6

Address management table 1181

| VOL# | Region ID | Shared page ID | Own page ID |
|---|---|---|---|
| 0 | 0 | 1 | 10 |
|   | 1 | - | - |
|   | 2 | - |   |
|   | 3 | - |   |
|   | ... | ... |   |
| 1 | 0 | 12 | - |
|   | 1 | - |   |
|   | 2 | 0 |   |
|   | 3 | - |   |
|   | ... | ... |   |
| ... | ... | ... |   |

Fig. 7

Page management table 1182

| Chunk ID | Page ID | Status | Address |
|---|---|---|---|
| 0 | 0 | Allocated | Vol1-2 |
| | 1 | Allocated | Vol0-0 |
| | 2 | Unallocated | - |
| | 3 | Unallocated | - |
| | 4 | Unallocated | - |
| 1 | 10 | Allocated | Vol2-1 |
| | 11 | Unallocated | - |
| | 12 | Allocated | Vol1-0 |
| | 13 | Unallocated | - |
| | 14 | Allocated | Vol2-8 |
| 2 | 20 | Allocated | Vol2-2 |
| | 21 | Allocated | Vol2-0 |
| | 22 | Unallocated | - |
| | 23 | Allocated | Vol3-1 |
| | 24 | Unallocated | - |
| 3 | 31 | Formatting | - |
| | 32 | ... | ... |
| | ... | ... | ... |
| ... | ... | ... | ... |

Fig. 9

STORAGE SYSTEM AND STORAGE CONTROL METHOD

TECHNICAL FIELD

The present invention relates to a storage control for a storage system that manages a snapshot of a logical volume that stores data.

BACKGROUND ART

The data of a volume that is managed by the storage system has been backed up conventionally. As the backup, a method for managing a snapshot in a state of a volume at a predetermined point of time has been known for instance.

In the case in which a snapshot is managed, when a write access occurs for a volume of a save source (a primary volume), the data of a region of a write destination of a primary volume is saved to a volume of a save destination (a secondary volume). After that, the data of a write target is copied to the primary volume, and a response is returned to a write access source. Consequently, it takes a long period of time to return a response to the write access source from an occurrence of the write access occurs, whereby a write response is deteriorated unfortunately.

On the other hand, the copy after write (CAW) technique has been known (see Patent Literature 1 for instance). For the copy after write (CAW) technique, in an occurrence of the write access, the write data is stored to a cache memory, a response is returned to the write access source, the data of a primary volume is saved to a secondary volume in an asynchronous manner with the write access, and the write data of the cache memory is written to the primary volume, whereby a write response is speeded up.

CITATION LIST

Patent Literature

PTL 1: US Patent Application Laid-Open Publication No. 2006/0143412

SUMMARY OF INVENTION

Technical Problem

For the technique that is described in the Patent Literature 1 for instance, in the case in which the next snapshot is acquired, when the data that has been stored into a cache is not reflected to the primary volume, a processing to the primary volume must be waited for a long period of time unfortunately until all of data that has not been saved for the primary volume is saved to the secondary volume and all of data that has not been reflected in the cache is then stored into the primary volume.

The present invention was made in consideration of such conditions and problems, and an object of the present invention is to provide a technique for shortening a time of a processing in an acquisition of the next snapshot while maintaining an access response.

Solution of Problem

A storage system is provided with a plurality of storage media, a memory region, a cache memory region, and a processor, and is coupled to a host computer in such a manner that the storage system can communicate with the host computer. A pool that is configured by a plurality of pages based on a plurality of storage media and a plurality of logical volumes are disposed. The plurality of logical volumes includes a primary volume and at least one secondary volume that is corresponded to at least one snapshot acquisition point of time of the primary volume. The primary volume is a logical volume that is configured by a plurality of logical regions in which data that is used for a processing of a host computer is stored. The secondary volume is a virtual logical volume that is configured by a plurality of virtual regions for holding a snapshot image of the primary volume. In the case in which a page in a pool is unallocated to a virtual region of a write destination of data, a page is allocated to the virtual region and data is stored into the page that has been allocated. The memory region stores the time relation information that indicates a time relationship of a data element that has been stored into the cache memory region and that is to be written to the logical region and a snapshot acquisition point of time to the primary volume for each of logical regions for instance.

The processor receives a write request from the host computer to the primary volume. The processor specifies a time relationship based on the time relation information in the memory for the data element that is to be written to a logical region of a write destination that conforms to the write request and that has been stored into the cache memory region. The processor judges whether or not the data element that has been stored into the cache memory region is a snapshot configuration element that is a data element that configures a snapshot image based on the time relationship. In the case in which the data element that has been stored into the cache memory region is a snapshot configuration element, the processor saves the data element in the cache memory region to the secondary volume for holding a snapshot image in which the snapshot configuration element is a configuration element, and a data element of a write target is then stored into the cache memory region. In the case in which the data element that has been stored into the cache memory region is not a snapshot configuration element, a data element of a write target is stored into the cache memory region.

BRIEF DESCRIPTION OF DRAWINGS

FIG. 5 is view for illustrating a pair information management table in accordance with an embodiment of the present invention.

FIG. 6 is view for illustrating a difference region management table in accordance with an embodiment of the present invention.

FIG. 7 is view for illustrating an address management table in accordance with an embodiment of the present invention.

FIG. 9 is view for illustrating a page management table in accordance with an embodiment of the present invention.

DESCRIPTION OF EMBODIMENTS

The preferred embodiments in accordance with the present invention will be described in the following with reference to drawings. The embodiments that will be described in the following do not restrict the invention that is related to the claims. Moreover, all of elements that are described in the embodiments and all of the combinations thereof are not essential for the solution means of the invention.

In the following descriptions, while a wide variety of information will be described in the expression of "xxx table" in some cases, a wide variety of information can be represented by a data structure other than a table. In order to indicate that a data structure is not depended on, "xxx table" can also be referred to as "xxx information".

In the following descriptions, while a number is adopted as a type of the identification information of a variety of targets (such as a volume, a chunk, and a page), the identification information of other types can also be adopted.

In the following descriptions, at least part of the processing that is executed by the controller described later is carried out by an execution of a computer program by a processor (such as a CPU (Central Processing Unit)). The processor can be a CPU itself. Moreover, the processor can include a hardware circuit that executes a part or a whole of a processing that is executed by the processor. A computer program can be installed from a program source to each of the controllers. The program source can be a program distribution server or a storage medium for instance.

An embodiment of the present invention will be described below in detail.

Figure 1:
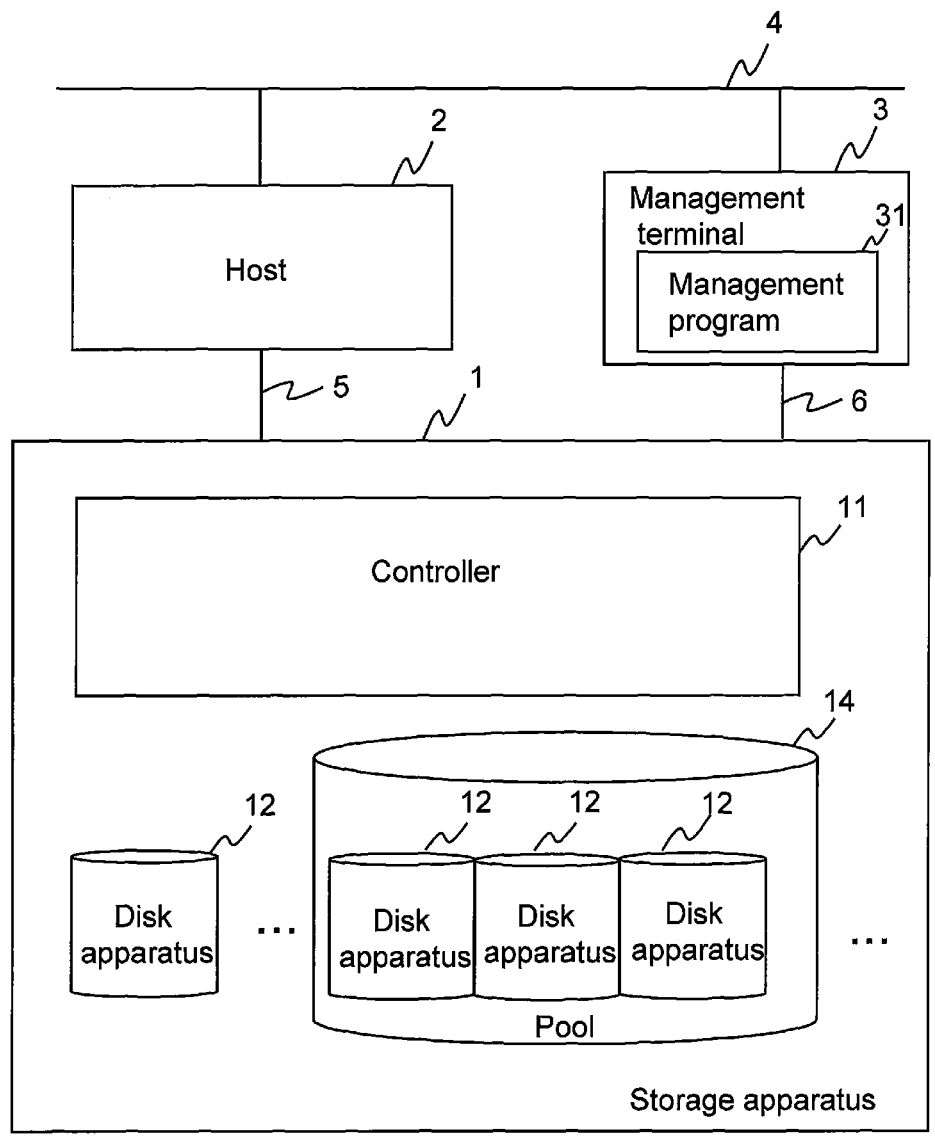
FIG. 1 is an entire block diagram showing a computer system in accordance with an embodiment of the present invention.

FIG. 1 is an entire block diagram showing a computer system in accordance with an embodiment of the present invention.

A computer system is provided with a storage apparatus 1 as an example of a storage system, a host computer (hereafter referred to as a host simply in some cases) 2, and a management terminal 3. The numbers of the storage apparatuses 1, the hosts 2, and the management terminals 3 can be at least one. The storage apparatus 1 and the host 2 are coupled to each other via a communication network (such as a SAN (Storage Area Network)) 5. Moreover, the storage apparatus 1 and the management terminal 3 are coupled to each other via a communication network (such as a LAN (Local Area Network)) 6. The storage apparatus 1 stores data that is used by the host 2. The host 2 executes a wide variety of processing, reads data from the storage apparatus 1, and writes data to the storage apparatus 1. The management terminal 3 executes a wide variety of processing in the case in which a CPU not shown in the figure executes a management program 31. The management terminal 3 is provided with a display apparatus, and can display a screen for a management of the storage apparatus 1 on the display apparatus. The management terminal 3 receives a management operation request from a user (for instance, an operator of the management terminal 3), and transmits the management operation request to the storage apparatus 1.

The storage apparatus 1 is provided with a controller 11 and a plurality of disk apparatuses 12. The controller 11 is coupled to each of the disk apparatuses 12 via an internal bus not shown in the figure. In the present embodiment, a storage region (hereafter referred to as a pool) 14 are formed based on the plurality of disk apparatuses 12.

The disk apparatus 12 is a drive of a storage medium of a disk type, and stores data of a write request from the host 2. The storage apparatus 1 can also be provided with a storage device (for instance, a flash memory drive) that is provided with a storage medium of other type in addition to the disk apparatus 12 or as substitute for the disk apparatus 12.

Figure 2:
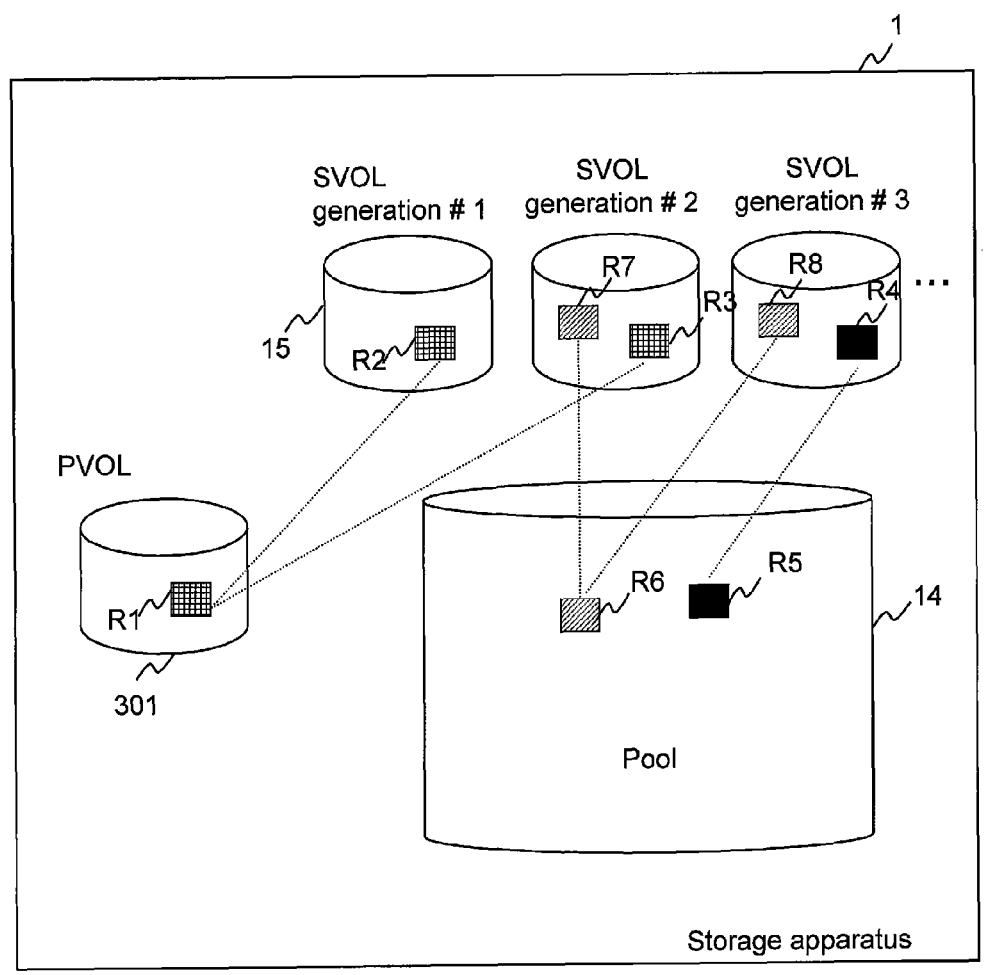
FIG. 2 is view for illustrating a relationship between a primary volume and a secondary volume in accordance with an embodiment of the present invention.

FIG. 2 is view for illustrating a relationship between a primary volume and a secondary volume in accordance with an embodiment of the present invention.

A primary volume (PVOL) 301 is a volume that writes data that is used for a processing by the host 2. The PVOL 301 can be a substantive logical volume based on a RAID group that is configured by a plurality of disk apparatuses 12 (a disk apparatus group that stores data at a predetermined RAID (Redundant Array of Independent (or Inexpensive) Disks) level) or can be a virtual logical volume that is not based on the RAID group (such as a volume that conforms to Thin Provisioning and a volume to which a storage resource (for instance a logical volume) of an external storage apparatus has been mapped). On the other hand, each of secondary volumes (SVOL) 15 is a volume that stores a snapshot image at a snapshot acquisition point of time to the PVOL 105. The SVOL 15 is a virtual logical volume, and data that is stored into the SVOL 15 is stored into the PVOL 301 or a pool 14 as a practical matter. In the present embodiment, the SVOL 15 indicates a snapshot acquisition point of time by using a generation number (a generation #), and a generation #1, a generation #2, a generation #3, and so on in an order from an older generation to a newer generation (in other words, the older a generation is, the smaller the number of the generation is).

A region R2 in the SVOL 15 of a generation #1 and a region R3 in the SVOL 15 of a generation #2 are set in such a manner that a region 1 in the PVOL is referred to. A region R4 in the SVOL 15 of a generation #3 is set in such a manner that a region R5 in the pool 14 that has stored data that has been saved from a region that has been updated between the generation #2 and the generation #3 (a region in the PVOL 301) is referred to. Moreover, a region R7 in the SVOL 15 of a generation #2 and a region R8 in the SVOL 15 of a generation #3 that are corresponded to a region that has been updated between the generation #1 and the generation #2 and that has not been updated between the generation #2 and the generation #3 (a region in the PVOL 301) are set in such a manner that a region R6 in the pool 14 that has stored data that has been saved from a region that has been updated between the generation #1 and the generation #2 (a region in the PVOL 301).

Figure 3:
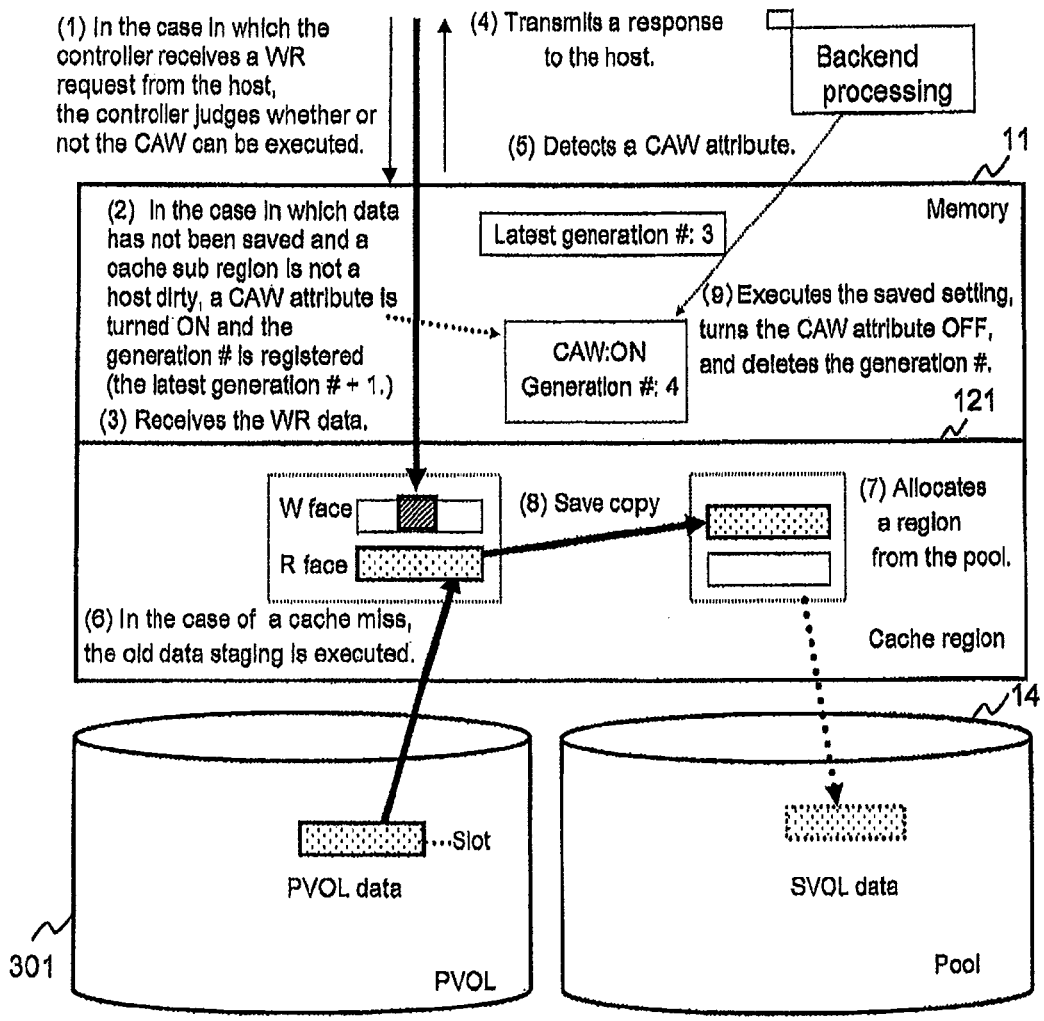
FIG. 3 is view for illustrating a summary of a part of a data management processing for a storage apparatus in accordance with an embodiment of the present invention.

FIG. 3 is view for illustrating a summary of a part of a data management processing for a storage apparatus in accordance with an embodiment of the present invention.

In the case in which the controller 11 receives a write (WR) request that specifies a PVOL 301 from the host 2, the controller 11 judges whether or not the CAW (Copy after write) can be executed (see (1) in the figure). In the case in which data has been unsaved from a region (a slot) of a write destination in the PVOL 301 and a cache sub region (hereafter referred to as an ensured region in some cases) that has been ensured in a cache region 121 is not a host dirty (in the case in which it is not an ensured region that stores data that has not been stored into the PVOL 301), a CAW attribute is turned ON and the latest generation number (the latest generation #)+1 (that is, a value obtained by adding 1 to the latest generation number) is registered as a generation #(see (2) in the figure). Here, ON of a CAW attribute represents that a CAW is to be executed and OFF of a CAW attribute represents that a CAW is not executed. A slot is a region in a predetermined capacity unit that is a management unit of the cache region 121. A slot size can be larger than a size of the write data in a write request from the host 2 for instance. In the present embodiment, the PVOL is divided into regions of a size equivalent to a size of a slot for a management, and a region that has been divided in a PVOL is also referred to as a slot.

In the next place, the controller 11 receives data of a write target that conforms to a write request (WR data: write data) from the host 2, and writes the write data to a write face (a W face) (a region that stores data that is written to a volume) of the ensured region. The controller 11 then transmits a response to the write request to the host 2 (see (4) in the figure).

In an asynchronous manner with the above (at a backend), the controller 11 detects a CAW attribute of a write destination region in the PVOL 301 (see (5) in the figure). In the case in which a CAW attribute is ON, the controller 11 judges whether or not data before an update of a write destination region (a region (a slot) in the PVOL) of data that is stored in the W face of the ensured region is cached to a read face (an R face) of the ensured region (a region that stores data that has been read from a volume). In the case of a cache miss, the controller 11 reads data from the write destination region in the PVOL 301 to the R face in the ensured region (staging) (see (6) in the figure). In the next place, the controller 11 allocates a region (a page) from the pool 14 to a region in the SVOL 15 that is corresponded to a write destination region (a region in the PVOL 301) (see (7) in the figure), and saves data that has been read to the R face (see (8) in the figure). Here, a page is a unit region that is allocated in the pool 14. A size of a page can be equivalent to a size of a slot for instance.

Figure 4:
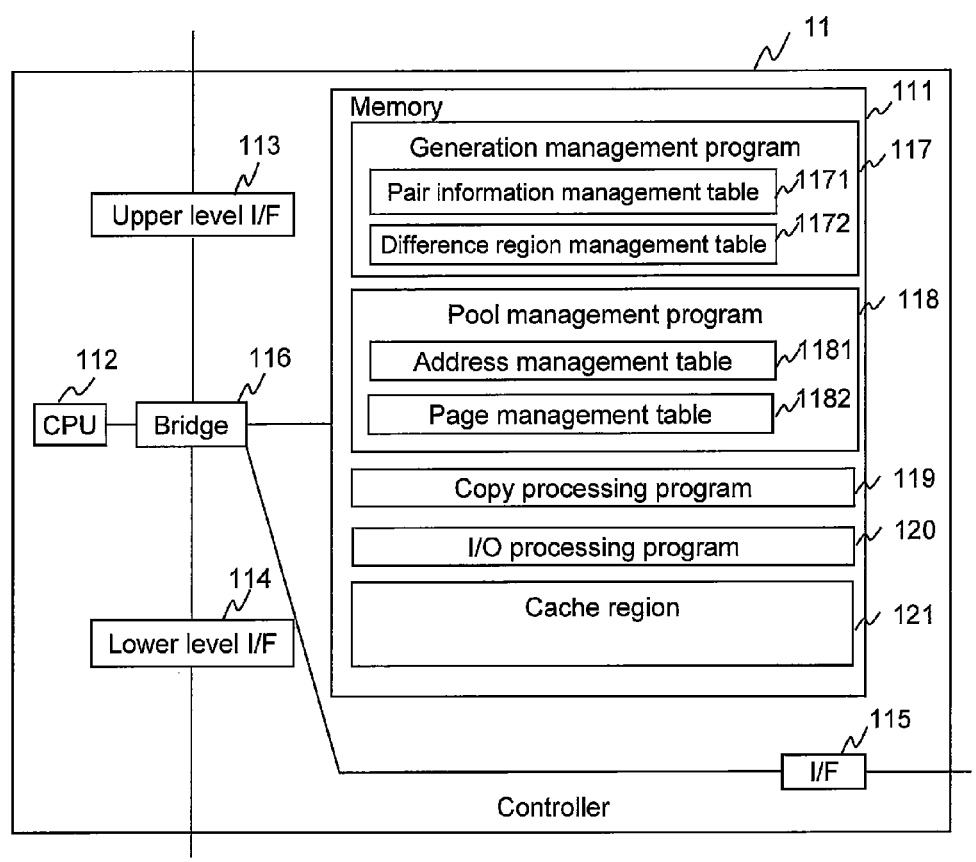
FIG. 4 is a block diagram showing a controller in accordance with an embodiment of the present invention.

FIG. 4 is a block diagram showing a controller in accordance with an embodiment of the present invention.

The controller 11 is provided with a memory 111, a CPU 112, an upper level interface (an upper level I/F) 113, a lower level interface (a lower level I/F) 114, an interface (an I/F) 115, and a bridge 116. The bridge 116 couples the memory 111, the CPU 112, the upper level I/F 113, a lower level I/F 114, and an I/F 115 to each other in such a manner that a communication can be carried out with each other.

The memory 111 stores data and a program that are required for a control. More specifically, the memory 111 stores a generation management program 117, a pool management program 118, a copy processing program 119, and an I/O processing program 120. The generation management program 117 manages a pair information management table 1171 and a difference region management table 1172, and executes a management processing of a snapshot. The pool management program 118 manages an address management table 1181 and a page management table 1182, and executes a management processing of a pool 14. The copy processing program 119 executes a copy processing of data. The I/O processing program 120 calls other program as needed, and executes an input/output processing of data.

Moreover, the memory 111 is provided with a cache region 121 that is configured by a cache memory. The cache region 121 is configured by a nonvolatile memory such as an SRAM and an EEPROM (Electrically Erasable Programmable Read Only Memory) or a DRAM that is backed up by a battery or the like. The cache region 121 stores data that is not volatilized even in the case in which the storage apparatus 1 is in a shutdown state.

The CPU 112 controls each part and executes a wide variety of processing by executing programs that have been stored into the memory 111. The upper level I/F 113 executes an intermediate step of a communication with the host 2. The upper level I/F 113 can also be a Fiber Channel (FC) or an iSCSI for instance. The lower level I/F 114 executes an intermediate step of a communication with the disk apparatus 12. The lower level I/F 114 is a disk I/F of an FC, a SAS, or a SATA for instance. The I/F 115 executes an intermediate step of a communication with the management terminal 3.

FIG. 5 is view for illustrating a pair information management table in accordance with an embodiment of the present invention. In the following descriptions, a logical volume is described as a VOL as needed.

A pair information management table 1171 manages the records to which a PVOL number (a PVOL #), a latest generation number (a latest generation #), a pair ID, an SVOL number (an SVOL #), a generation number (a generation #), and a status are corresponded.

The PVOL # is a number that uniquely identifies a volume (a PVOL) that is a copy source in the storage apparatus 1. The latest generation # is a generation number of the latest snapshot of a corresponded PVOL. The pair ID is a number that uniquely identifies a pair (a copy pair) of a PVOL and an SVOL. The SVOL # is a number that uniquely identifies a volume (an SVOL) that is a copy destination in the storage apparatus 1. The generation # is a generation number of a snapshot that is stored into a corresponded SVOL. The status is a status of a corresponded copy pair. As the status, there are Snapshot Held that indicates a status in which a snapshot is held, Snapshot not Acquired that indicates a status in which a snapshot has not been acquired, and Under Restore that indicates a status in which a restore from a corresponded SVOL is executed. "Restore" is to copy the snapshot date saved in the SVOL to the PVOL.

For instance, the top record in the figure indicates that a VOL of a VOL #0 is a PVOL, the latest generation number is 3, a copy pair with an SVOL of a VOL #6 is configured, the pair ID is 0, the generation number of the SVOL is 1, and a snapshot is held.

FIG. 6 is view for illustrating a difference region management table in accordance with an embodiment of the present invention.

The difference region management table 1172 manages the records to which a PVOL number (a PVOL #), a region ID, a save status, a restore status, a CAW attribute, and a generation number (a generation #) are corresponded.

The PVOL # is a number that uniquely identifies a volume (a PVOL) that is a copy source in the storage apparatus 1. The region ID is an example of the region identification information, and is a number that identifies a region (a slot) that is classified for a VOL. The save status is the information that indicates whether or not data that is written to a region of a PVOL is saved to a pool 14. As the save status, there are Saved that indicates that data has been saved and Unsaved that indicates that data has not been saved for instance. The restore status is the information that indicates a status of a restore in the case in which a restore is executed. As the restore status, Done that indicates that a restore has been done is set in the case in which a restore has been executed, and Undone is set in the case in which a restore has not been executed. As the CAW attribute, ON is set in the case in which it is necessary that a CAW is executed for the region, that is, in the case in which it is necessary that a copy for saving data from a region of a corresponded PVOL is executed, and OFF is set in the case in which it is not necessary that a CAW is executed for the region, that is, in the case in which it is not necessary that data is saved from a region of a PVOL. The generation # is a generation number of a snapshot that is corresponded to data that is to be written to the corresponded region (data (a data element) in the cache region 121). In the present embodiment, as a generation # of a data element that has been written after the latest snapshot acquisition point of time, the latest generation # of a snapshot at a point of time of the write+1 is set. Here, the generation number is an example of the time relation information that indicates a time relationship with a snapshot acquisition point of time to the PVOL. As substitute for a generation #, a snapshot acquisition time can be managed. The point is that the time relation information is information by which a correspondence to the acquisition point of time of each snapshot and the previous or next time relationship can be known for a data element.

For instance, the second record in the figure indicates that a data element has been unsaved for a region of a region # of 1 in a VOL of a VOL # of 0, a restore has not been executed, a CAW is executed in the case in which data is written to the region, and a generation # of a snapshot is 2 for data in the region.

FIG. 7 is view for illustrating an address management table in accordance with an embodiment of the present invention.

The address management table 1181 manages the records to which a VOL number (a VOL #), a region ID, a shared page ID, and an own page ID are corresponded.

The VOL # is a number that uniquely identifies an SVOL in the storage apparatus 1. The region ID is a number that identifies a region that is classified for a VOL. The shared page ID is a number that identifies a shared page in which data of the region is stored. The shared page is a page that can be referred to from other SVOL. The own page ID is a number that identifies an own page in which data of the region is stored. The own page is a page that is referred to by only the corresponded SVOL. More specifically, the corresponded SVOL manages a snapshot that can be written, and the own page is a page that stores data in the case in which a write has been executed to the SVOL. For instance, the top record in the figure indicates that the shared page ID is 1 and the own page ID is 10 for a region of a region # of 0 for a VOL of a VOL # of 0.

Figure 8:
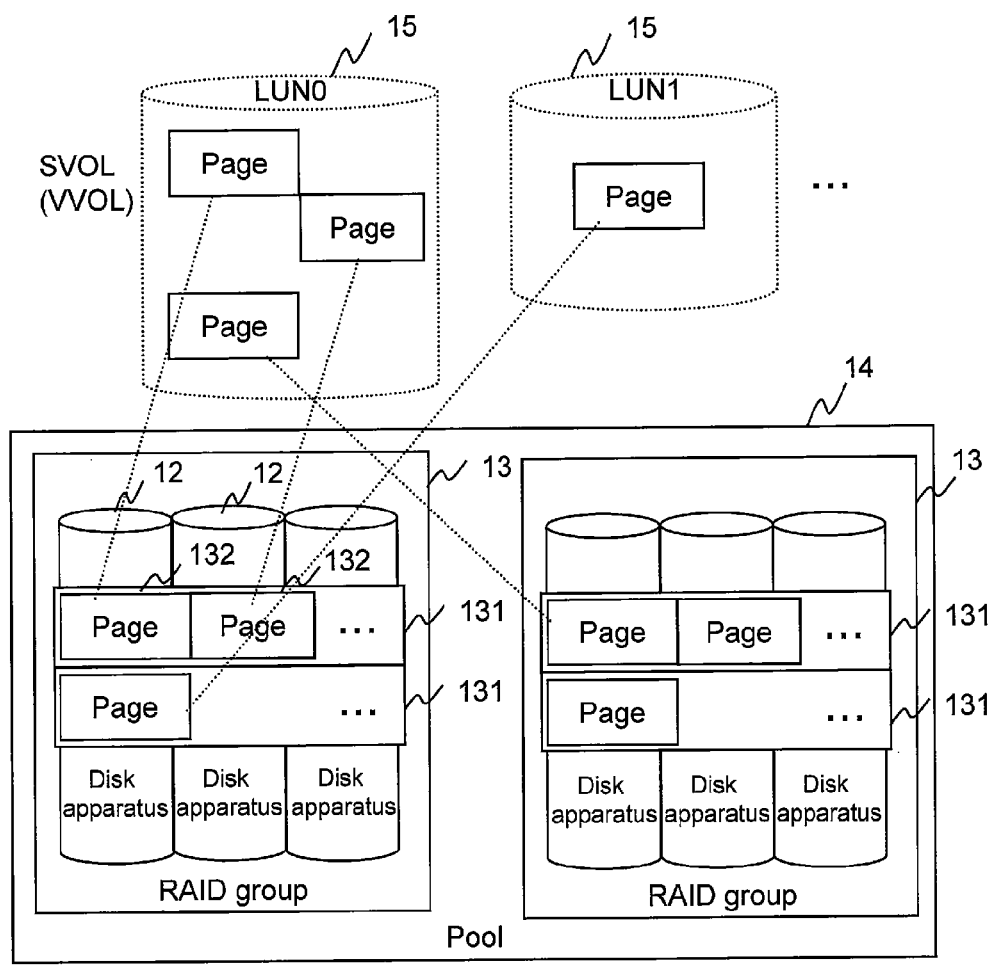
FIG. 8 is view for illustrating a pool and an SVOL in accordance with an embodiment of the present invention.

FIG. 8 is view for illustrating a pool and an SVOL in accordance with an embodiment of the present invention.

The pool 14 is a storage region based on a RAID (Redundant Array of Independent (or Inexpensive) Disks) group 13 that is configured by a plurality of disk apparatuses 12. The pool 14 is configured by a plurality of chunks 131, and each of the chunks 131 is configured by a plurality of pages 132. For the SVOL (virtual volume: VVOL) 15, a page 132 of the pool 14 is allocated to a region in which data is stored as a practical matter.

FIG. 9 is view for illustrating a page management table in accordance with an embodiment of the present invention.

A page management table 1182 manages the records to which a chunk ID, a page ID, a status, and an address are corresponded. The chunk ID is a number that uniquely identifies a chunk 131 that includes a page 132 in the pool 14. The page ID is a number that uniquely identifies a page 132 in the pool 14. The status is a status of the page 132. As the status of a page, there are Allocated and Unallocated for instance. The address is an address of a volume to which a corresponded page has been allocated. For instance, the top record in the figure indicates that the page 132 of the page ID of 0 for the chunk 131 of the chunk ID of 0 has been allocated as a region of an address 2 of a volume of Vol1.

In the next place, an operation that is executed by the storage apparatus 1 will be described in the following.

Figure 10:
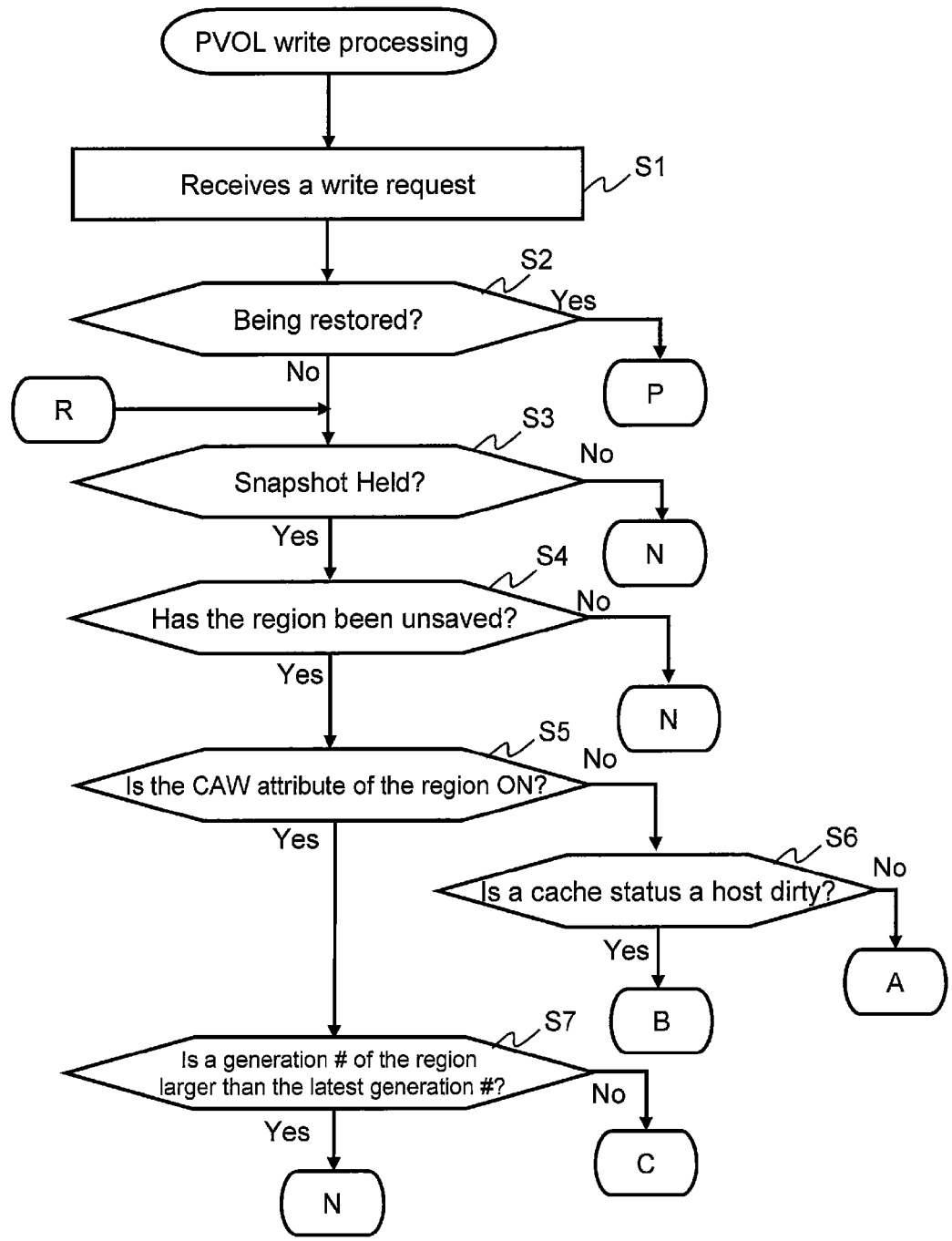
FIG. 10 is a first flowchart of a PVOL write processing in accordance with an embodiment of the present invention.

FIG. 10 is a first flowchart of a PVOL write processing in accordance with an embodiment of the present invention.

As shown in FIG. 10, in the case in which the controller 11 of the storage apparatus 1 receives a write request from the host 2 in a PVOL write processing (step S1), the controller 11 of the storage apparatus 1 judges whether or not a PVOL that is corresponded to the write request is being restored by referring to a status of the PVOL # of a write target of the write request in the pair information management table 1171 (step S2). Here, the write request includes a LUN (logical unit number) that indicates a PVOL to which the write data is written and an LBA (logical block address) that belongs to a write destination region of the PVOL. By using the LUN and the LBA, a VOL # of the PVOL and a region ID of the write destination region can be identified. Moreover, restore is to reflect the snapshot image saved to the SVOL to the region of the PVOL.

Figure 15:
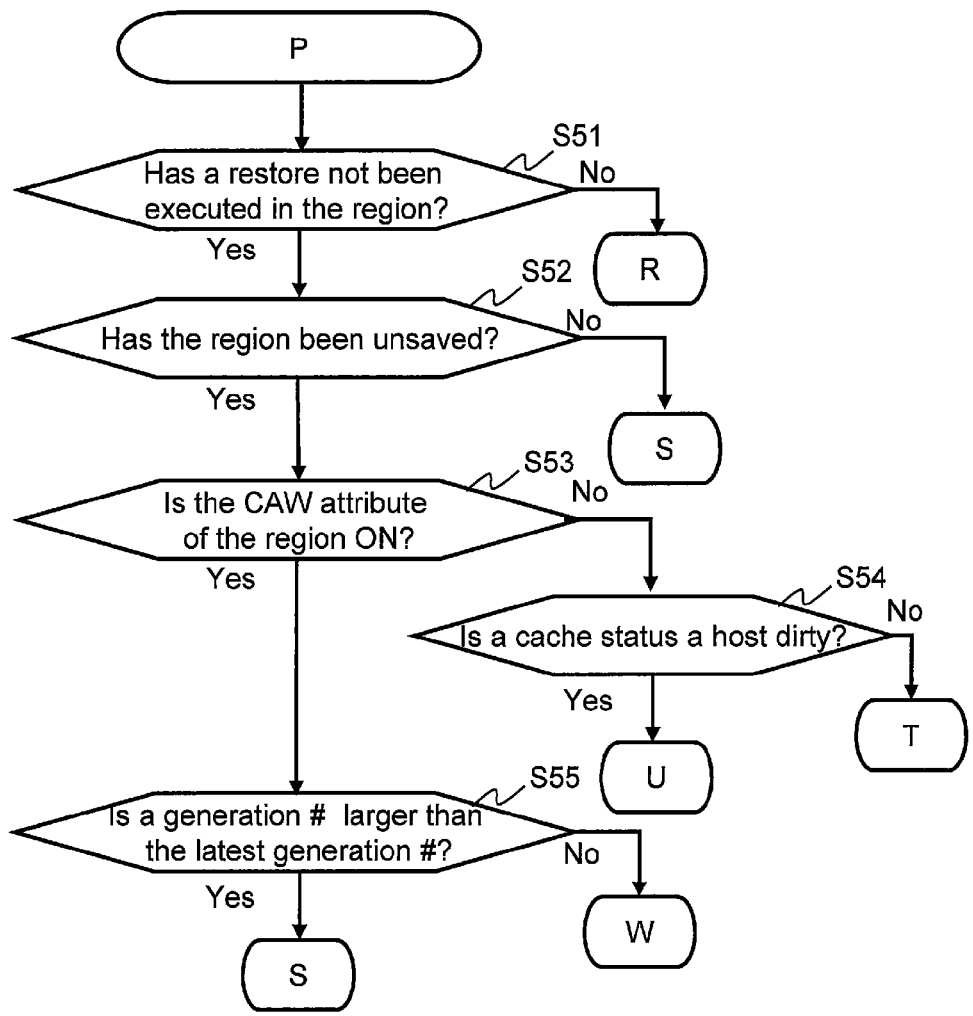
FIG. 15 is a sixth flowchart of a PVOL write processing in accordance with an embodiment of the present invention.

In the case in which the PVOL that is corresponded to the write request is being restored (Yes for the step S2) as a result of a judgment of the step S2, the controller 11 proceeds the processing to a point P (see FIG. 15). On the other hand, in the case in which the PVOL that is corresponded to the write request is not being restored (No for the step S2) or the processing proceeds from a point R, the controller 11 judges whether or not a status is Snapshot Held for a slot that includes a region of a write target of a write request based on the difference region management table 1172 (step S3).

Figure 12:
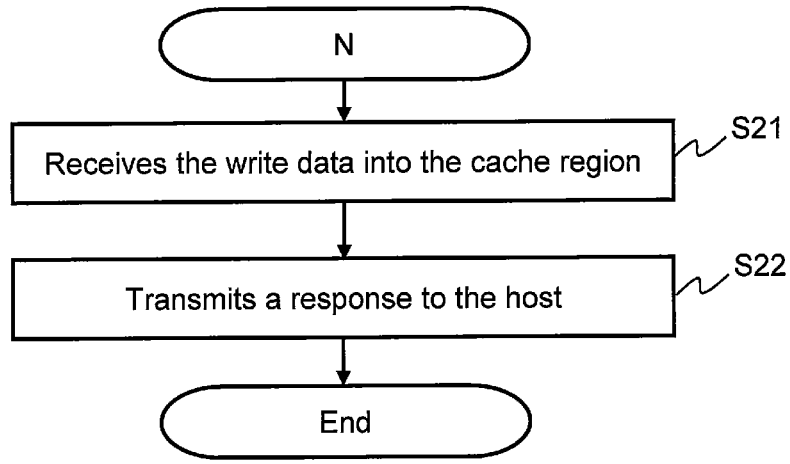
FIG. 12 is a third flowchart of a PVOL write processing in accordance with an embodiment of the present invention.

In the case in which a status is not Snapshot Held (No for the step S3) as a result of a judgment of the step S3, the controller 11 proceeds the processing to a point N (see FIG. 12). On the other hand, in the case in which a status is Snapshot Held (Yes for the step S3), the controller 11 refers to the difference region management table 1172 and judges whether or not the slot has been unsaved, that is, a data element of a cache region 121 that is to be written to the slot has been unsaved (step S4). In the case in which the slot has not been unsaved (No for the step S4) as a result of a judgment of the step S4, the controller 11 proceeds the processing to a point N (see FIG. 12). On the other hand, in the case in which the slot has been unsaved (Yes for the step S4), the controller 11 refers to the difference region management table 1172 and judges whether or not the CAW attribute of the slot is ON (step S5).

In the case in which the CAW attribute of the slot is not ON (No for the step S5) as a result of a judgment of the step S5, the controller 11 judges whether or not a cache status of the cache region 121 is a host dirty, that is, there is data on the W face of the cache region 121 that is corresponded to the slot (step S6). In the case in which a cache status of the cache region 121 is not a host dirty (No for the step S6), the controller 11 proceeds the processing to a point A (see FIG. 11). On the other hand, in the case in which a cache status of the cache region 121 is a host dirty (Yes for the step S6), the controller 11 proceeds the processing to a point B (see FIG. 13).

On the other hand, in the case in which the CAW attribute of the slot is ON (Yes for the step S5) as a result of a judgment of the step S5, the controller 11 judges whether or not a generation # of the region is larger than the latest generation # (step S7). In the case in which a generation # of the region is larger than the latest generation # (Yes for the step S7), since it is indicated that data of the cache region 121 that is to be written to the region is data that has been updated after the point of time when the latest snapshot is acquired and is not data that configures the snapshot (is not a snapshot configuration element), the controller 11 proceeds the processing to a point N (see FIG. 12). On the other hand, in the case in which a generation # of the region is equal to or less than the latest generation # (No for the step S7), since it is indicated that the next snapshot has been acquired after the point of time when data of the cache region 121 that is to be written to the region is written and the data of the cache region 121 is a snapshot configuration element, the controller 11 proceeds the processing to a point C (see FIG. 14).

Figure 11:
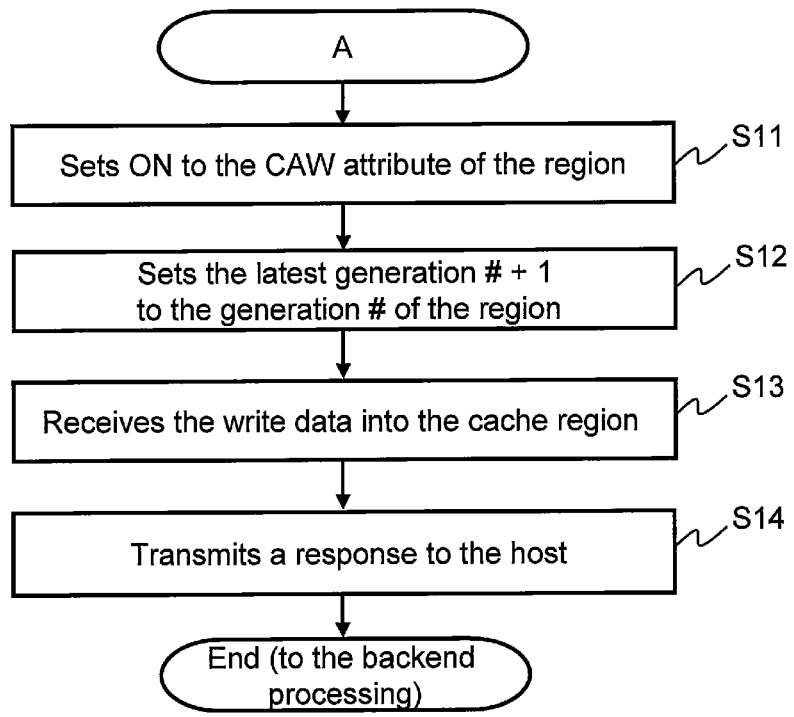
FIG. 11 is a second flowchart of a PVOL write processing in accordance with an embodiment of the present invention.

FIG. 11 is a second flowchart of a PVOL write processing in accordance with an embodiment of the present invention.

In the case in which the processing proceeds to the point A as shown in FIG. 11, the controller 11 sets the CAW attribute of the region that is corresponded to the write request of the difference region management table 1172 to ON (step S11) and sets a value that is obtained by adding 1 to the latest generation # of the corresponded PVOL of the pair information management table 1171 to the generation # of the region (step S12). By this process, it can be known that data of the cache region 121 that is to be stored into the region is data that has been updated after the point of time when the latest snapshot was acquired. The controller 11 then stores the write data that is to be written to the region into the cache region 121 of the memory 111 (step S13) and transmits a response to the write request to the host 2 (step S14).

FIG. 12 is a third flowchart of a PVOL write processing in accordance with an embodiment of the present invention.

In the case in which the processing proceeds to the point N as shown in FIG. 12, the controller 11 stores the write data to the cache region 121 of the memory 111 (step S21), and transmits a response to the write request to the host 2 (step S22). By this process, data of the cache region 121 is updated to be new write data.

Figure 13:
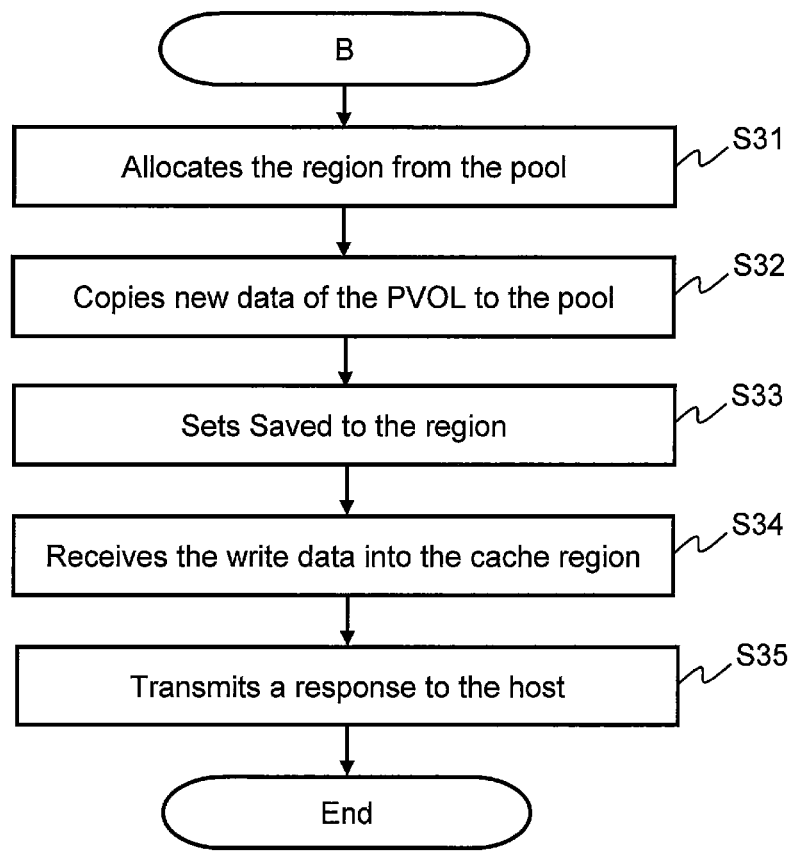
FIG. 13 is a fourth flowchart of a PVOL write processing in accordance with an embodiment of the present invention.

FIG. 13 is a fourth flowchart of a PVOL write processing in accordance with an embodiment of the present invention.

In the case in which the processing proceeds to the point B as shown in FIG. 13, the controller 11 identifies a generation # that is corresponded to a region of a PVOL of a write target based on the difference region management table 1172, identifies an SVOL of the generation # based on the pair information management table 1171, allocates the region from the pool 14 to the region of the SVOL that is corresponded to a region of the write target, and updates the page management table 1182 in accordance with the allocation (step S31). In other words, a status of a page that has been allocated is made to be Allocated, and an address of a corresponded region of the SVOL is set. In the next place, the controller 11 copies data of the PVOL that has been stored into the cache region 121 to a region (a page) that has been allocated (step S32). In the case in which data that has been stored into the cache region 121 is only data of a part of a slot, the controller 11 reads data the corresponded slot of the PVOL to the R face of the cache region 121, complements data of an insufficient part of the slot with data that has been read to the R face, and copies the data to the allocated page.

In the next place, the controller 11 sets Saved to a save status that is corresponded to the region of the difference region management table 1172 (step S33), stores the write data to the cache region 121 of the memory 111 (step S34), and transmits a response to the write request to the host 2 (step S35).

Figure 14:
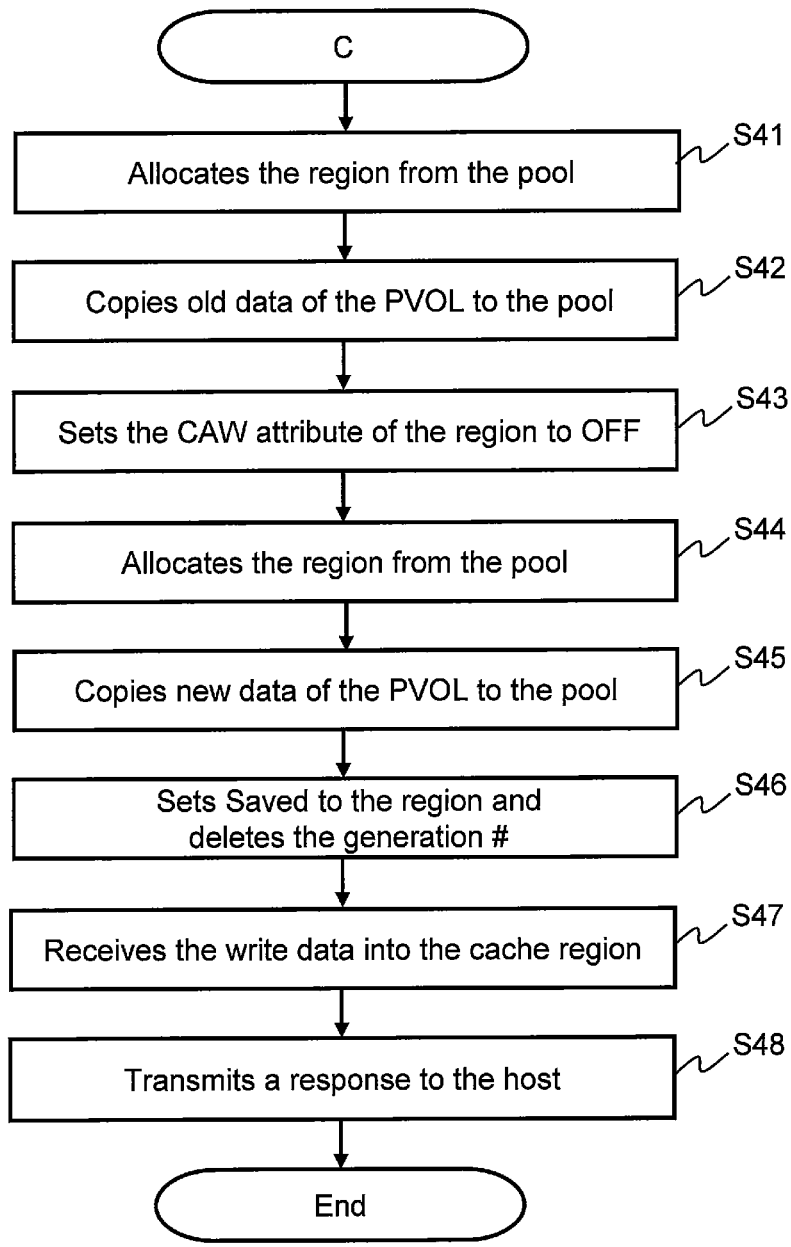
FIG. 14 is a fifth flowchart of a PVOL write processing in accordance with an embodiment of the present invention.

FIG. 14 is a fifth flowchart of a PVOL write processing in accordance with an embodiment of the present invention.

In the case in which the processing proceeds to the point C as shown in FIG. 14, the controller 11 identifies a generation # that is corresponded to a region of a PVOL of a write target based on the difference region management table 1172, identifies an SVOL of the previous generation, that is, an SVOL of the generation #-1 based on the pair information management table 1171, allocates a page from the pool 14 to the region of the SVOL that is corresponded to a region of the write target, and updates the page management table 1182 in accordance with the allocation (step S41). In the next place, the controller 11 copies data of the corresponded region that has been stored into the PVOL (old data: data that configures a snapshot of the previous generation) to the page that has been allocated (step S42), and sets the CAW attribute of the region that is corresponded of the difference region management table 1172 to OFF (step S43). By this process, a snapshot configuration element of the previous generation can be saved to an SVOL that manages a snapshot of the previous generation in an appropriate manner. In addition, since it is a save processing for a data element of one region of the PVOL, the processing can be terminated in a relatively short time.

In the next place, the controller 11 identifies a generation # that is corresponded to a region of a PVOL of a write target based on the difference region management table 1172, identifies an SVOL of the generation based on the pair information management table 1171, allocates a page from the pool 14 to the region of the SVOL that is corresponded to a region of the write target, and updates the page management table 1182 in accordance with the allocation (step S44). In the next place, the controller 11 copies data that is to be written to the PVOL that has been stored into the cache region 121 (a snapshot configuration element of the present generation) to the page that has been allocated (step S45), sets Saved to a save status that is corresponded to the region of the difference region management table 1172, and deletes the generation # (step S46). By this process, a snapshot configuration element of the present generation can be saved to an SVOL that manages a snapshot image of the present generation in an appropriate manner. In addition, since it is a save processing for a data element of the cache region 121 that is corresponded to one region of the PVOL, the processing can be terminated in a relatively short time.

In the next place, the controller 11 stores the write data to the cache region 121 of the memory 111 (step S47), and transmits a response to the write request to the host 2 (step S48). By this process, since it is only a save processing for a data element that is corresponded to one region of the PVOL, the processing can be terminated in a relatively short time, and a write response to the host 2 can be made relatively fast.

FIG. 15 is a sixth flowchart of a PVOL write processing in accordance with an embodiment of the present invention.

In the case in which the processing proceeds to the point P as shown in FIG. 15, the controller 11 refers to the difference region management table 1172 and judges whether or not a restore has not been executed in a region of the PVOL that is corresponded to the write request (step S51). In the case in which a restore has been executed and completed (No for the step S51), the controller 11 proceeds the processing to a point R (see FIG. 10). On the other hand, in the case in which a restore has not been executed (Yes for the step S51), the controller 11 refers to the difference region management table 1172 and judges whether or not a data element of the cache region 121 that is to be stored into the corresponded region has been unsaved (step S52). In the case in which the data element has not been unsaved (No for the step S52) as a result of the judgment, the controller 11 proceeds the processing to a point S (see FIG. 16). On the other hand, in the case in which the slot has been unsaved (Yes for the step S52), the controller 11 refers to the difference region management table 1172 and judges whether or not the CAW attribute of the slot is ON (step S53).

In the case in which the CAW attribute of the slot is not ON (No for the step S53) as a result of the judgment, the controller 11 judges whether or not a cache status of the cache region 121 is a host dirty, that is, there is data on the W face of the cache region 121 that is corresponded to the slot (step S54). In the case in which a cache status of the cache region 121 is not a host dirty (No for the step S54), the controller 11 proceeds the processing to a point T (see FIG. 17). On the other hand, in the case in which a cache status of the cache region 121 is a host dirty (Yes for the step S54), the controller 11 proceeds the processing to a point U (see FIG. 18).

On the other hand, in the case in which the CAW attribute of the slot is ON (Yes for the step S53) as a result of a judgment of the step S53, the controller 11 judges whether or not a generation # of the region is larger than the latest generation # (step S55). In the case in which a generation # of the region is larger than the latest generation # (Yes for the step S55), the controller 11 proceeds the processing to a point S (see FIG. 16). On the other hand, in the case in which a generation # of the region is equal to or less than the latest generation # (No for the step S55), the controller 11 proceeds the processing to a point W (see FIG. 19).

Figure 16:
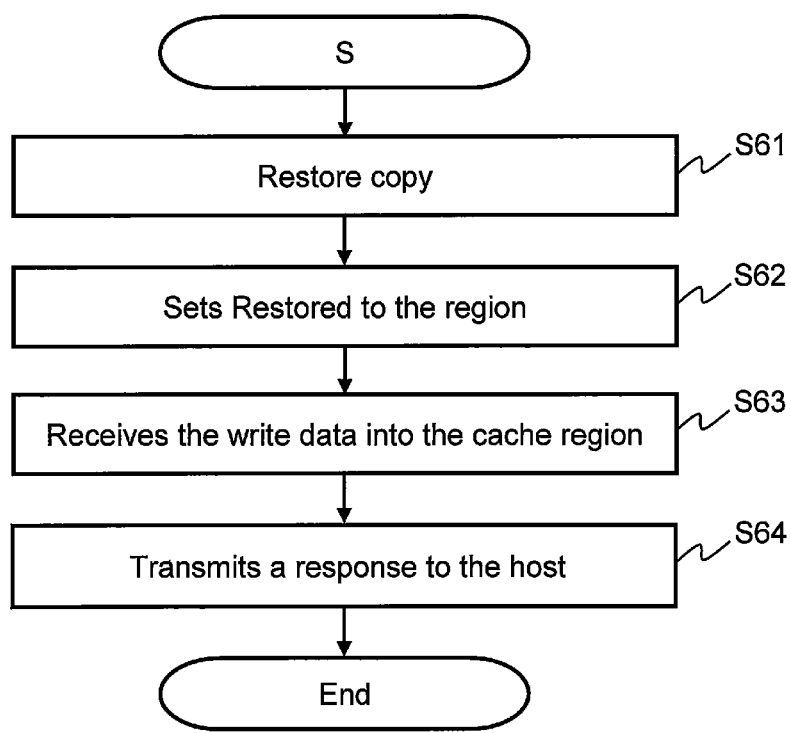
FIG. 16 is a seventh flowchart of a PVOL write processing in accordance with an embodiment of the present invention.

FIG. 16 is a seventh flowchart of a PVOL write processing in accordance with an embodiment of the present invention.

In the case in which the processing proceeds to the point S as shown in FIG. 16, the controller 11 executes a restore copy from the SVOL to the PVOL for the corresponded region (step S61) and sets Restored to a restore status of the corresponded region of the difference region management table 1172 (step S62). In the next place, the controller 11 stores the write data to the cache region 121 of the memory 111 (step S63), and transmits a response to the write request to the host 2 (step S64).

Figure 17:
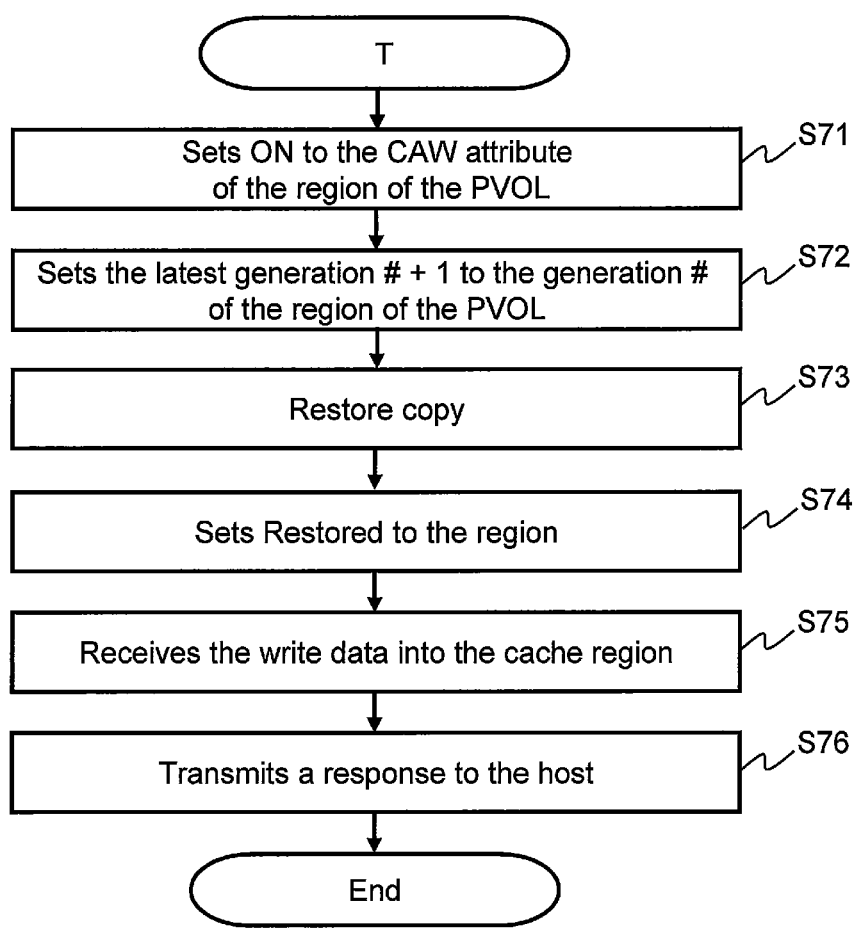
FIG. 17 is an eighth flowchart of a PVOL write processing in accordance with an embodiment of the present invention.

FIG. 17 is an eighth flowchart of a PVOL write processing in accordance with an embodiment of the present invention.

In the case in which the processing proceeds to the point T as shown in FIG. 17, the controller 11 sets the CAW attribute of the region that is corresponded to the write request of the difference region management table 1172 to ON (step S71) and sets a value that is obtained by adding 1 to the latest generation # of the corresponded PVOL of the pair information management table 1171 to the generation # of the region (step S72). By this process, it can be known that data of the cache region 121 that is to be stored into the region is data that has been updated after the point of time when the latest snapshot was acquired. In the next place, the controller 11 executes a restore copy from the SVOL to the PVOL for the corresponded region (step S73) and sets Restored to a restore status of the corresponded region of the difference region management table 1172 (step S74). In the next place, the controller 11 stores the write data to the cache region 121 of the memory 111 (step S75), and transmits a response to the write request to the host 2 (step S76).

Figure 18:
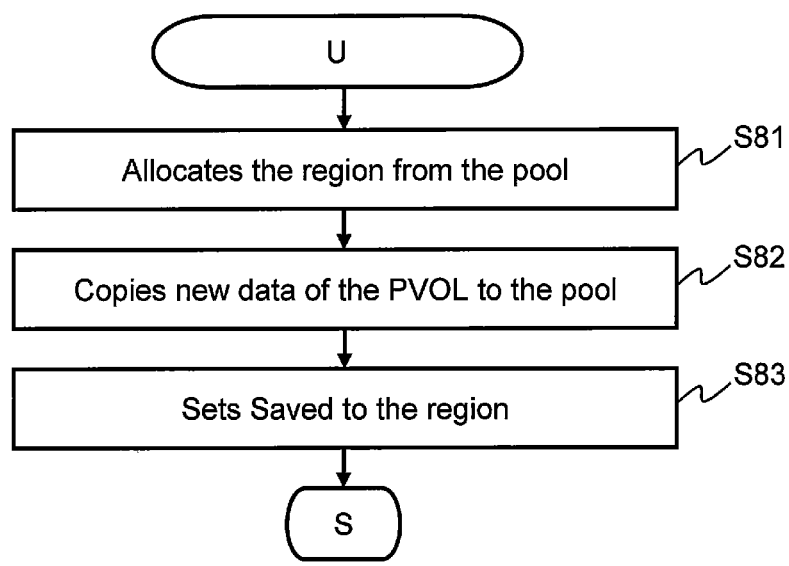
FIG. 18 is a ninth flowchart of a PVOL write processing in accordance with an embodiment of the present invention.

FIG. 18 is a ninth flowchart of a PVOL write processing in accordance with an embodiment of the present invention.

In the case in which the processing proceeds to the point U as shown in FIG. 18, the controller 11 identifies a generation # that is corresponded to a region of a PVOL of a write target based on the difference region management table 1172, identifies an SVOL of the generation # based on the pair information management table 1171, allocates the page from the pool 14 to the region of the SVOL that is corresponded to a region of the write target, and updates the page management table 1182 in accordance with the allocation (step S81). In the next place, the controller 11 copies data of the PVOL that has been stored into the cache region 121 to a region that has been allocated (step S82). In the case in which data that has been stored into the cache region 121 is only data of a part of a slot, the controller 11 reads data the corresponded slot of the PVOL to the R face of the cache region 121, complements data of an insufficient part of the slot with data that has been read to the R face, and copies the data to the allocated page. In the next place, the controller 11 sets Saved to a save status that is corresponded to the region of the difference region management table 1172 (step S83), and proceeds the processing to the point S (see FIG. 16).

Figure 19:
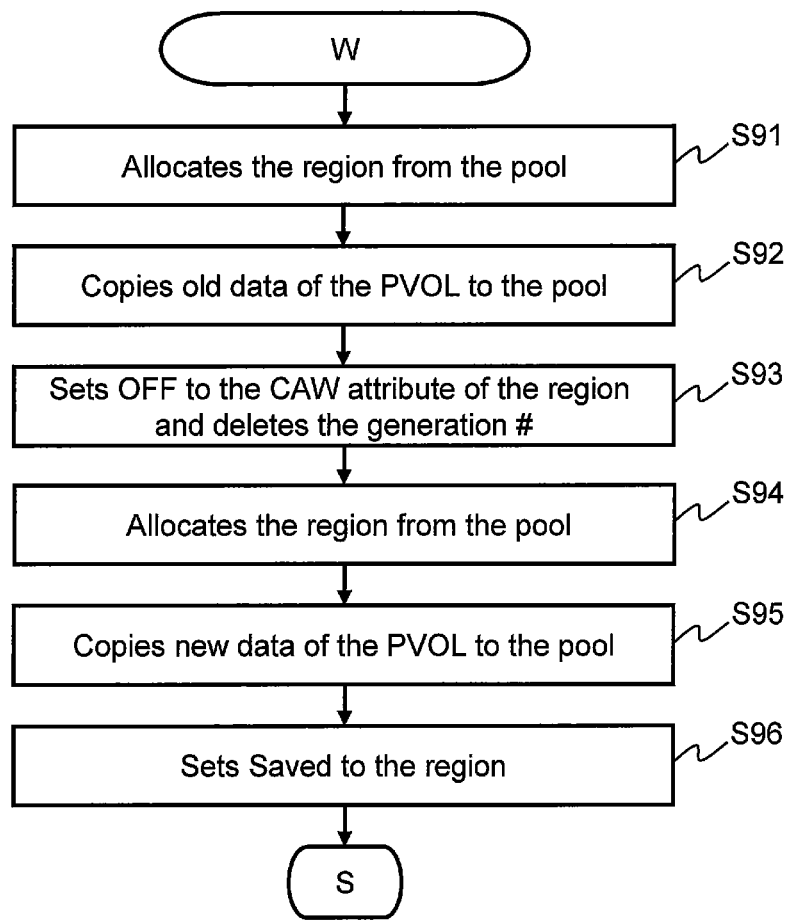
FIG. 19 is a tenth flowchart of a PVOL write processing in accordance with an embodiment of the present invention.

FIG. 19 is a tenth flowchart of a PVOL write processing in accordance with an embodiment of the present invention.

In the case in which the processing proceeds to the point W as shown in FIG. 19, the controller 11 identifies a generation # that is corresponded to a region of a PVOL of a write target based on the difference region management table 1172, identifies an SVOL of the previous generation, that is, an SVOL of the generation #-1 based on the pair information management table 1171, allocates a region from the pool 14 to the region of the SVOL that is corresponded to a region of the write target, and updates the page management table 1182 in accordance with the allocation (step S91). In the next place, the controller 11 copies data of the corresponded region that has been stored into the PVOL (old data: data that configures a snapshot of the previous generation) to the page that has been allocated (step S92), sets the CAW attribute of the region that is corresponded of the difference region management table 1172 to OFF, and deletes the generation # (step S93). By this process, a snapshot configuration element of the previous generation can be saved to an SVOL that manages a snapshot image of the previous generation in an appropriate manner. In addition, since it is a save processing for one region of the PVOL, the processing can be terminated in a relatively short time.

In the next place, the controller 11 identifies a generation # that is corresponded to a region of a PVOL of a write target based on the difference region management table 1172, identifies an SVOL of the generation # based on the pair information management table 1171, allocates a page from the pool 14 to the region of the SVOL that is corresponded to a region of the write target, and updates the page management table 1182 in accordance with the allocation (step S94). In the next place, the controller 11 copies data that is corresponded to the PVOL that has been stored into the cache region 121 (data of a snapshot of the present generation) to the page that has been allocated (step S95), sets Saved to a save status of the corresponded region of the difference region management table 1172 (step S96), and proceeds the processing to the point S (see FIG. 16). By this process, a snapshot configuration element of the present generation can be saved to an SVOL that manages a snapshot image of the present generation in an appropriate manner. In addition, since it is a save processing for a data element of the cache region 121 that is corresponded to one region of the PVOL, the processing can be terminated in a relatively short time.

Figure 20:
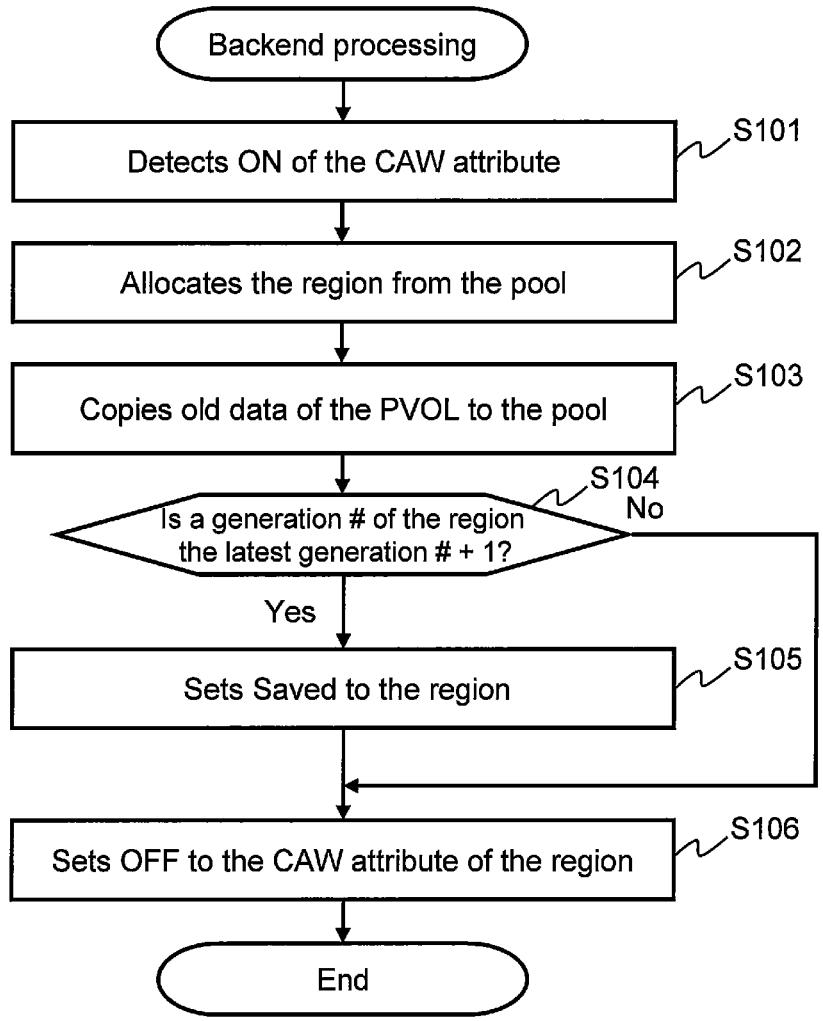
FIG. 20 is a flowchart of a backend processing in accordance with an embodiment of the present invention.

FIG. 20 is a flowchart of a backend processing in accordance with an embodiment of the present invention.

The backend processing is executed at an arbitrary timing such as for every predetermined time and in a time when an access frequency is low for instance. The controller 11 refers to the difference region management table 1172 and detects a region of the PVOL in which the CAW attribute is ON (step S101). In the next place, the controller 11 identifies a generation # that is corresponded to the detected region based on the difference region management table 1172, identifies an SVOL of the generation #−1 based on the pair information management table 1171, allocates a region from the pool 14 to the region of the SVOL, and updates the page management table 1182 in accordance with the allocation (step S102). In the next place, the controller 11 copies data of the corresponded region that has been stored into the PVOL to the page that has been allocated (step S103).

In the next place, the controller 11 judges whether or not a generation # of the region is the latest generation #+1 (step S104). In the case in which a generation # of the region is the latest generation #+1 (Yes for the step S104), the controller 11 sets Saved to a save status that is corresponded to the region of the difference region management table 1172 (step S105). On the other hand, in the case in which a generation # of the region is not the latest generation #+1 (No for the step S104), the controller 11 do nothing. In the next place, the controller 11 sets the CAW attribute that is corresponded of the region of the difference region management table 1172 to OFF (step S106). By this process, data of the region in which the CAW attribute of the PVOL is ON can be saved to the SVOL in an asynchronous manner with an I/O request. In addition, since data of the region of the PVOL can be saved to the SVOL, a situation in which data of the region of the PVOL must be saved to the SVOL before the write data is stored into the cache region 121 for the PVOL write processing, such as a situation that is corresponded to No of the step S7, can be suppressed, whereby the write response can be improved.

Figure 21:
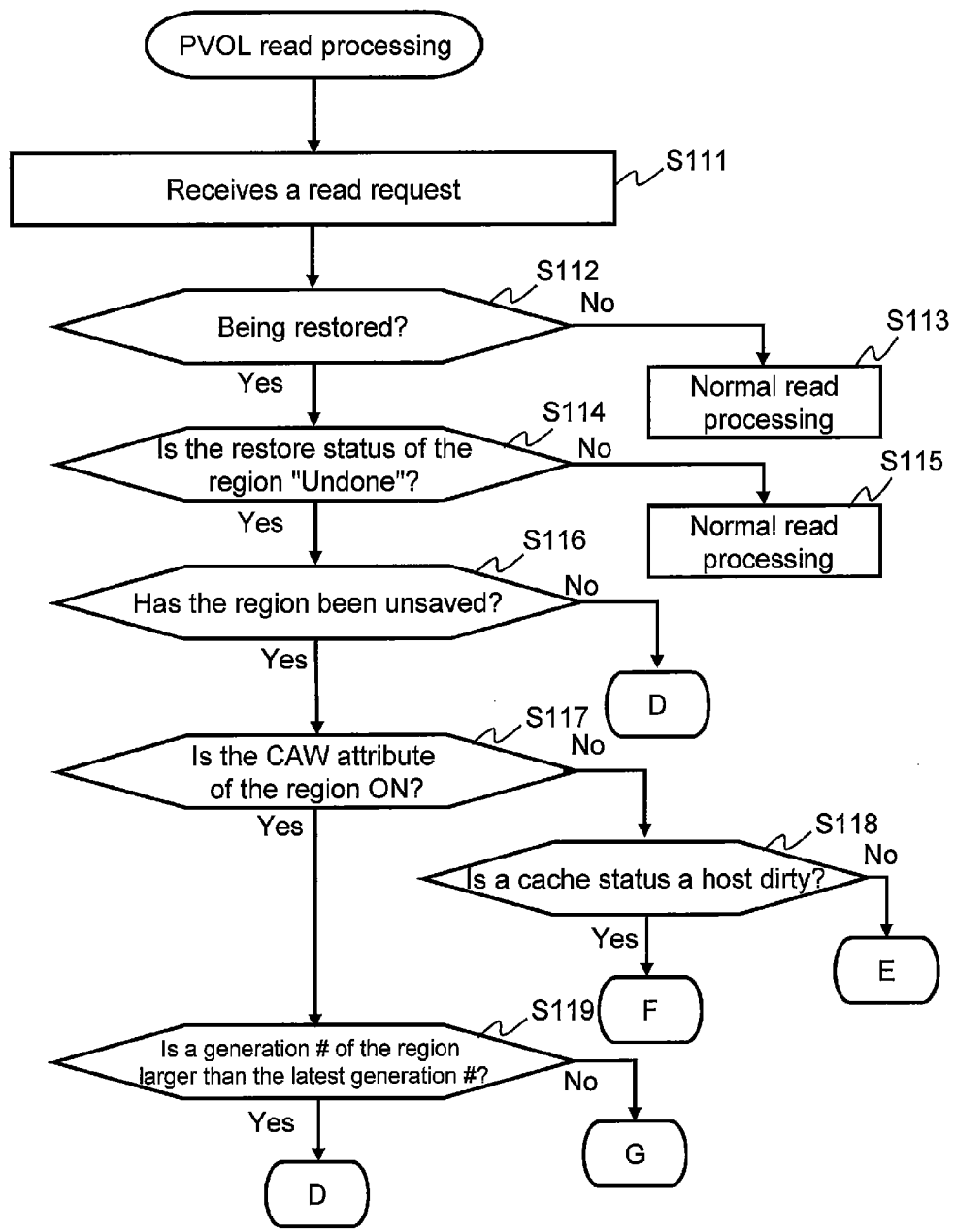
FIG. 21 is a first flowchart of a PVOL read processing in accordance with an embodiment of the present invention.

FIG. 21 is a first flowchart of a PVOL read processing in accordance with an embodiment of the present invention.

For a PVOL read processing, in the case in which the controller 11 receives a read request from the host 2 (step S111), the controller 11 of the storage apparatus 1 judges whether or not a PVOL that is corresponded to the read request is being restored by referring to a status of the PVOL of a read target of the read request in the pair information management table 1171 (step S112). In the case in which the PVOL that is corresponded to the read request is not being restored (No for the step S112) as a result of the judgment, the controller 11 executes the normal read processing for reading data from a region of the corresponded PVOL (or the cache region 121 that stores data of the region) (step S113). On the other hand, in the case in which the PVOL that is corresponded to the read request is being restored (Yes for the step S112), the controller 11 refers to the difference region management table 1172 and judges whether or not a restore has not been executed in a slot of the PVOL that is corresponded to the read request (step S114). In the case in which a restore has been executed and completed (No for the step S114), the controller 11 executes the normal read processing.

On the other hand, in the case in which a restore has not been executed (Yes for the step S114), the controller 11 refers to the difference region management table 1172 and judges whether or not the corresponded slot has been unsaved, that is, a data element of the cache region 121 that is to be written to the slot has been unsaved (step S116). In the case in which the data element has not been unsaved (No for the step S116) as a result of the judgment, the controller 11 proceeds the processing to a point D (see FIG. 22). On the other hand, in the case in which the slot has been unsaved (Yes for the step S116), the controller 11 refers to the difference region management table 1172 and judges whether or not the CAW attribute of the slot is ON (step S117).

In the case in which the CAW attribute of the slot is not ON (No for the step S117) as a result of the judgment, the controller 11 judges whether or not a cache status of the cache region 121 is a host dirty, that is, there is data on the W face of the cache region 121 that is corresponded to the slot (step S118). In the case in which a cache status of the cache region 121 is not a host dirty (No for the step S118), the controller 11 proceeds the processing to a point E (see FIG. 23). On the other hand, in the case in which a cache status of the cache region 121 is a host dirty (Yes for the step S118), the controller 11 proceeds the processing to a point F (see FIG. 24).

On the other hand, in the case in which the CAW attribute of the slot is ON (Yes for the step S117) as a result of a judgment of the step S117, the controller 11 judges whether or not a generation # of the region is larger than the latest generation # (step S119). In the case in which a generation # of the region is larger than the latest generation # (Yes for the step S119), the controller 11 proceeds the processing to a point D (see FIG. 22). On the other hand, in the case in which a generation # of the region is equal to or less than the latest generation # (No for the step S119), the controller 11 proceeds the processing to a point G (see FIG. 25).

Figure 22:
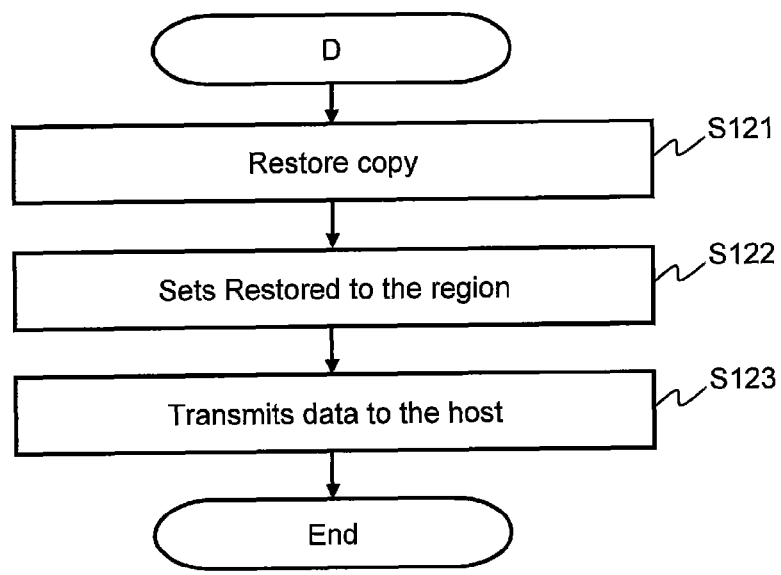
FIG. 22 is a second flowchart of a PVOL read processing in accordance with an embodiment of the present invention.

FIG. 22 is a second flowchart of a PVOL read processing in accordance with an embodiment of the present invention.

In the case in which the processing proceeds to the point D as shown in FIG. 22, the controller 11 executes a restore copy from the SVOL to the PVOL for the corresponded slot (step S121) and sets Restored to a restore status of the corresponded slot of the difference region management table 1172

(step S122). In the next place, the controller 11 reads the corresponded region of the PVOL, and transmits data to the host 2 (step S123).

Figure 23:
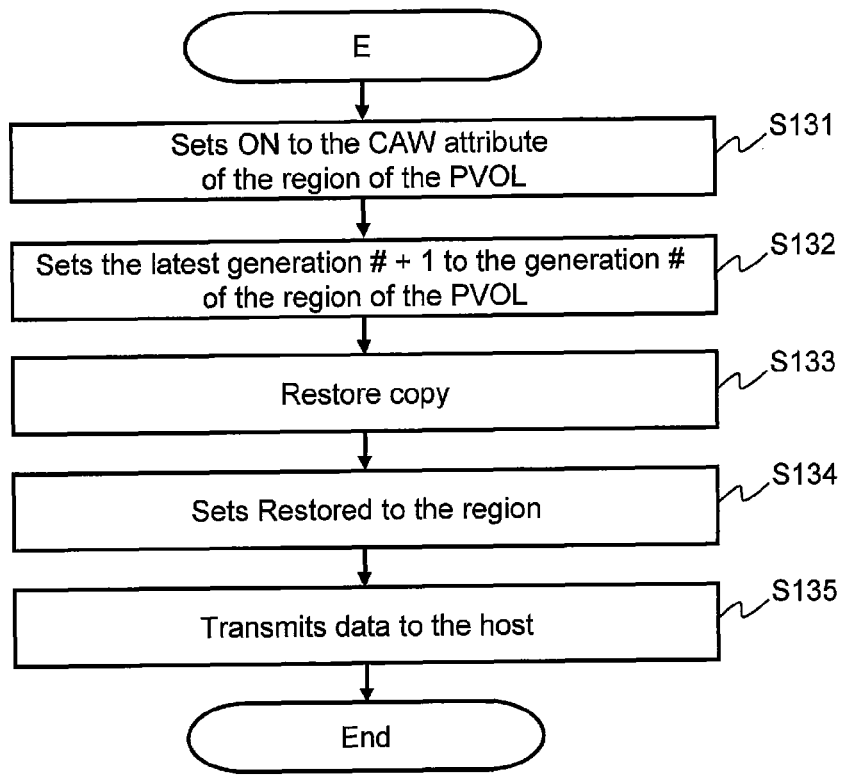
FIG. 23 is a third flowchart of a PVOL read processing in accordance with an embodiment of the present invention.

FIG. 23 is a third flowchart of a PVOL read processing in accordance with an embodiment of the present invention.

In the case in which the processing proceeds to the point E as shown in FIG. 23, the controller 11 sets the CAW attribute of the slot that includes the region that is corresponded to the read request of the difference region management table 1172 to ON (step S131) and sets a value that is obtained by adding 1 to the latest generation # of the corresponded PVOL of the pair information management table 1171 to the generation # of the region (step S132). In the next place, the controller 11 executes a restore copy from the SVOL to the PVOL for the corresponded region (step S133) and sets Restored to a restore status of the corresponded region of the difference region management table 1172 (step S134). In the next place, the controller 11 reads the corresponded region of the PVOL, and transmits data to the host 2 (step S135).

Figure 24:
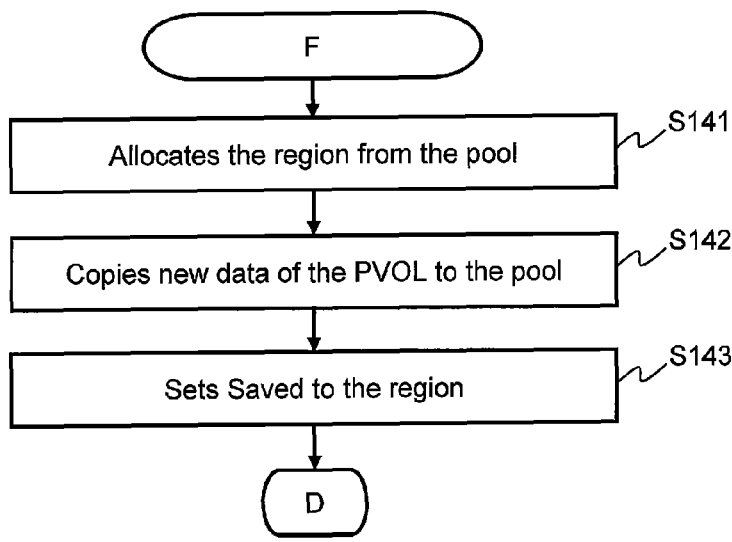
FIG. 24 is a fourth flowchart of a PVOL read processing in accordance with an embodiment of the present invention.

FIG. 24 is a fourth flowchart of a PVOL read processing in accordance with an embodiment of the present invention.

In the case in which the processing proceeds to the point F as shown in FIG. 24, the controller 11 identifies a generation # that is corresponded to the slot that includes the region of a PVOL of a read target based on the difference region management table 1172, identifies an SVOL of the generation # based on the pair information management table 1171, allocates the page from the pool 14 to the region of the SVOL that is corresponded to a region of the read target, and updates the page management table 1182 in accordance with the allocation (step S141). In the next place, the controller 11 copies data that is to be written to the PVOL that has been stored into the cache region 121 to a region that has been allocated (step S142). In the case in which data that has been stored into the cache region 121 is only data of a part of a slot, the controller 11 reads data the corresponded slot of the PVOL to the R face of the cache region 121, complements data of an insufficient part of the slot with data that has been read to the R face, and copies the data to the allocated page. In the next place, the controller 11 sets Saved to a save status that is corresponded to the slot of the difference region management table 1172 (step S143), and proceeds the processing to the point D (see FIG. 22).

Figure 25:
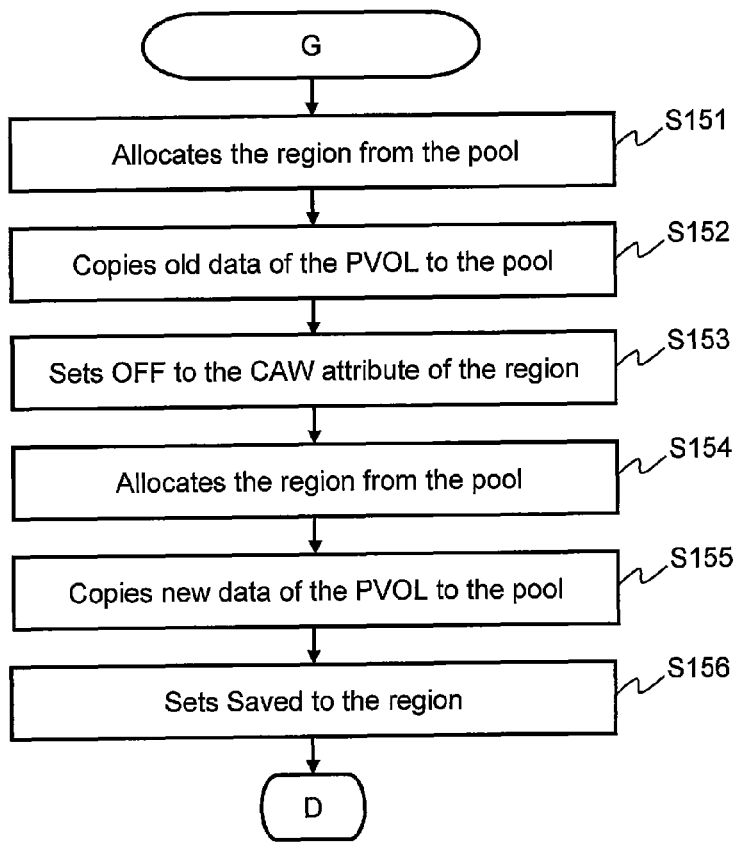
FIG. 25 is a fifth flowchart of a PVOL read processing in accordance with an embodiment of the present invention.

FIG. 25 is a fifth flowchart of a PVOL read processing in accordance with an embodiment of the present invention.

In the case in which the processing proceeds to the point G as shown in FIG. 25, the controller 11 identifies a generation # that is corresponded to the slot that includes the region of a PVOL of a read target based on the difference region management table 1172, identifies an SVOL of the previous generation, that is, an SVOL of the generation #–1 based on the pair information management table 1171, allocates a page from the pool 14 to the region of the SVOL that is corresponded to a region of the read target, and updates the page management table 1182 in accordance with the allocation (step S151). In the next place, the controller 11 copies data of the corresponded region that has been stored into the PVOL (old data: data that configures a snapshot of the previous generation) to the page that has been allocated (step S152), and sets the CAW attribute of the region that is corresponded of the difference region management table 1172 to OFF (step S153). By this process, a snapshot configuration element of the previous generation can be saved to an SVOL that manages a snapshot image of the previous generation in an appropriate manner. In addition, since it is a save processing for one region of the PVOL, the processing can be terminated in a relatively short time.

In the next place, the controller 11 identifies a generation # that is corresponded to a region of a PVOL of a read target based on the difference region management table 1172, identifies an SVOL of the generation # based on the pair information management table 1171, allocates a page from the pool 14 to the region of the SVOL that is corresponded to a region of the read target, and updates the page management table 1182 in accordance with the allocation (step S154). In the next place, the controller 11 copies data that is corresponded to the PVOL that has been stored into the cache region 121 (a snapshot configuration element of the present generation) to the page that has been allocated (step S155), sets Saved to a save status of the corresponded region of the difference region management table 1172 (step S156), and proceeds the processing to the point D (see FIG. 22). By this process, a snapshot configuration element of the present generation can be saved to an SVOL that manages a snapshot image of the present generation in an appropriate manner. In addition, since it is a save processing for a data element of the cache region 121 that is corresponded to one region of the PVOL, the processing can be terminated in a relatively short time.

Figure 26:
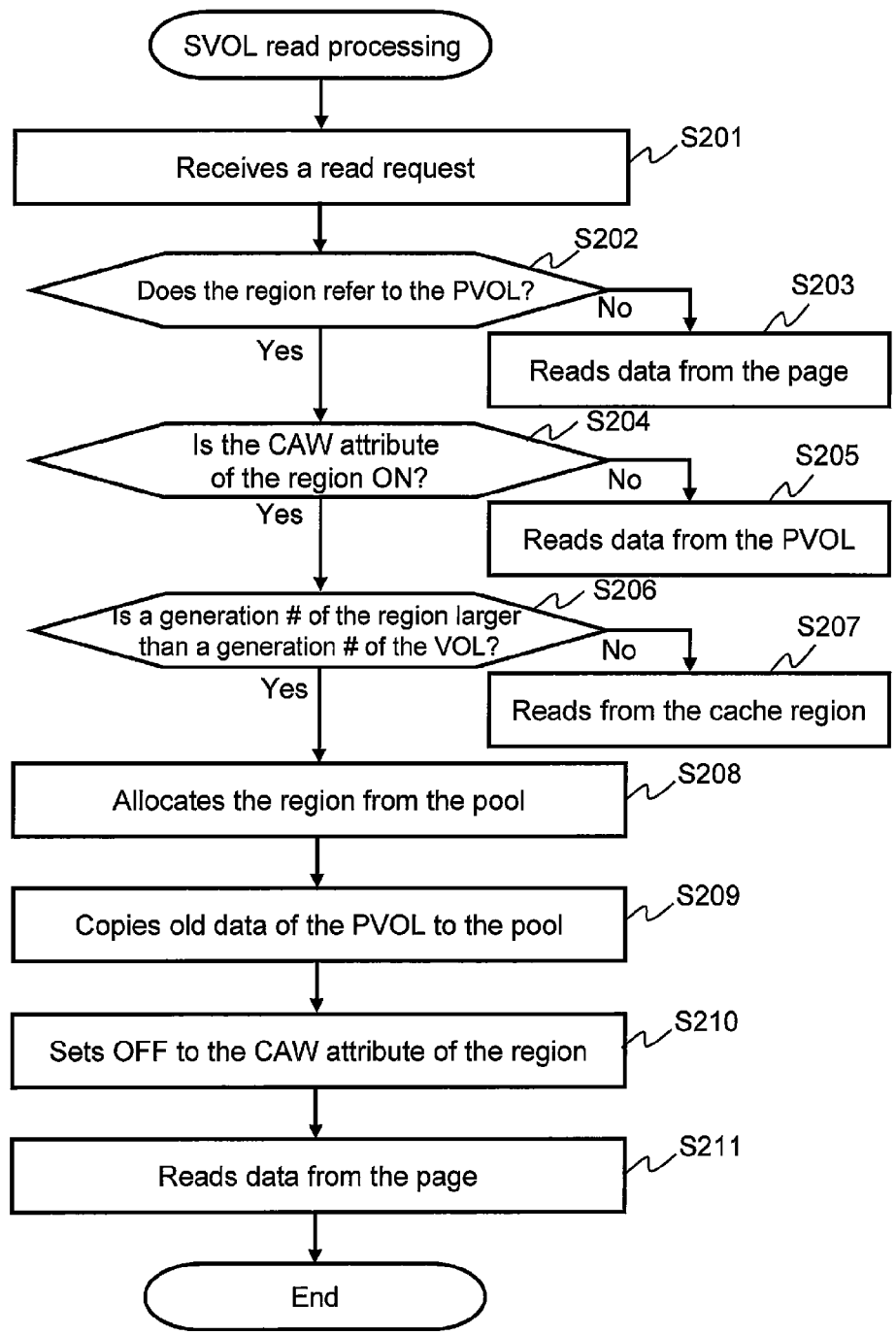
FIG. 26 is a flowchart of an SVOL read processing in accordance with an embodiment of the present invention.

FIG. 26 is a flowchart of an SVOL read processing in accordance with an embodiment of the present invention.

For an SVOL read processing, in the case in which the controller 11 receives a read request from the host 2 (step S201), the controller 11 of the storage apparatus 1 judges whether or not a region (a page) of the SVOL that is corresponded to the read request refers to a PVOL by referring to the address management table 1181 (step S202). In the case in which the PVOL is not being referred to (No for the step S202) as a result of the judgment, the controller 11 reads data from a page that is corresponded to the SVOL, and transmits the data to the host 2 (step S203).

On the other hand, in the case in which the PVOL is being referred to (Yes for the step S202), the controller 11 refers to the difference region management table 1172 and judges whether or not the CAW attribute of the slot of the PVOL that is corresponded to the region of the SVOL is ON (step S204). In the case in which the CAW attribute of the slot is not ON (No for the step S204) as a result of the judgment, the controller 11 reads data from a corresponded slot of the corresponded PVOL, and transmits the data to the host 2 (step S205).

On the other hand, in the case in which the CAW attribute of the slot is ON (Yes for the step S204) as a result of the judgment, the controller 11 judges whether or not a generation # of the slot is larger than a generation # of the SVOL (step S206). In the case in which a generation # of the slot is equal to or less than a generation # of the SVOL (No for the step S206), since the data that has been stored into the cache region 121 is a data element before the point of time when the snapshot of the SVOL is acquired, the controller 11 reads data from the cache region 121 that is corresponded to the region of the PVOL, and transmits the data to the host 2 (step S207).

On the other hand, in the case in which a generation # of the slot is larger than a generation # of the SVOL (Yes for the step S206), since the data that has been stored into the cache region 121 is a data element after the point of time when the snapshot of the SVOL is acquired, the controller 11 allocates a page from the pool 14 to the region of the SVOL, and updates the page management table 1182 in accordance with the allocation (step S208). In the next place, the controller 11 copies data of the corresponded region that has been stored into the PVOL (old data: data that configures a snapshot of the previous generation) to the page that has been allocated (step S209), sets the CAW attribute of the region that is corresponded of the difference region management table 1172 to OFF (step S210), reads data from a page that is corresponded to the region of the SVOL of the read target, and transmits the data to the host 2 (step S211).

Figure 27:
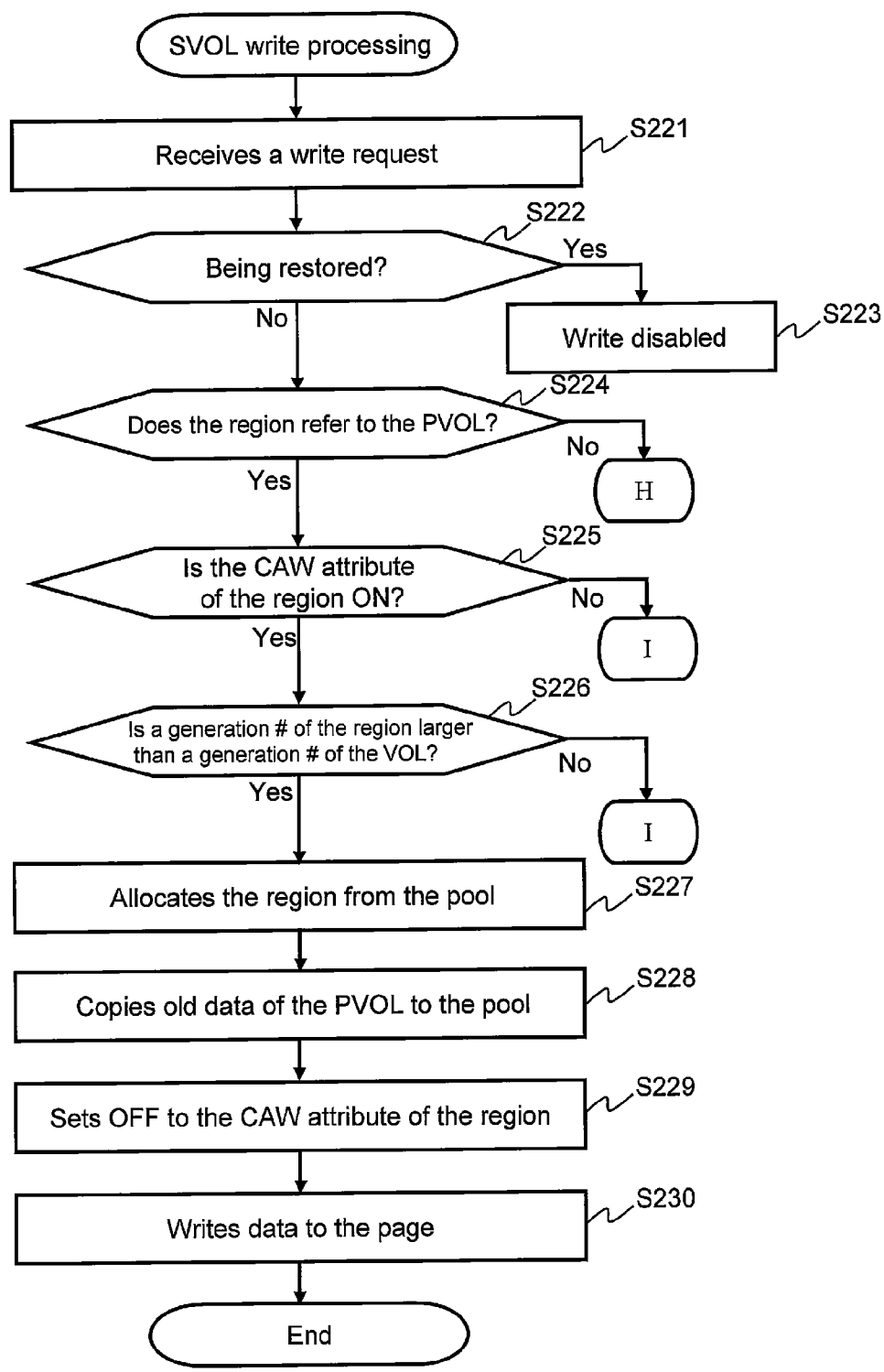
FIG. 27 is a first flowchart of an SVOL write processing in accordance with an embodiment of the present invention.

FIG. 27 is a first flowchart of an SVOL write processing in accordance with an embodiment of the present invention.

For an SVOL write processing, in the case in which the controller 11 receives a write request from the host 2 (step S221), the controller 11 of the storage apparatus 1 judges whether or not an SVOL of the write target is being restored by referring to a status that is corresponded to the SVOL of the write target of the write request in the pair information management table 1171 (step S222). In the case in which the SVOL that is corresponded to the write request is being restored (Yes for the step S222) as a result of the judgment, the controller 11 does not execute the write processing (step S223).

On the other hand, in the case in which the SVOL that is corresponded to the write request is not being restored (No for the step S222) as a result of the judgment, the controller 11 of the storage apparatus 1 judges whether or not a region of the SVOL that is corresponded to the write request refers to a PVOL by referring to the address management table 1181 (step S224). In the case in which the PVOL is not being referred to (No for the step S224) as a result of the judgment, the controller 11 proceeds the processing to a point H (see FIG. 28).

On the other hand, in the case in which the PVOL is being referred to (Yes for the step S224), the controller 11 refers to the difference region management table 1172 and judges whether or not the CAW attribute of the slot is ON (step S225). In the case in which the CAW attribute of the slot is not ON (No for the step S225) as a result of the judgment, the controller 11 proceeds the processing to a point I (see FIG. 29).

On the other hand, in the case in which the CAW attribute of the slot is ON (Yes for the step S225) as a result of the judgment, the controller 11 judges whether or not a generation # of the slot is larger than a generation # of the SVOL (step S226). In the case in which a generation # of the slot is equal to or less than a generation # of the SVOL (No for the step S226), the controller 11 proceeds the processing to a point I (see FIG. 29).

On the other hand, in the case in which a generation # of the slot is larger than a generation # of the SVOL (Yes for the step S226), the controller 11 allocates a page from the pool 14 to the region of the SVOL that is corresponded to the region of the write target, and updates the page management table 1182 in accordance with the allocation (step S227). In the next place, the controller 11 copies data of the corresponded region of the corresponded PVOL (old data: data that configures a snapshot of the previous generation) to the region that has been allocated (step S228), sets the CAW attribute of the region that is corresponded of the difference region management table 1172 to OFF (step S229), writes data to a page that is corresponded to the region of the SVOL of the write target, and transmits a response to the host 2 (step S230).

Figure 28:
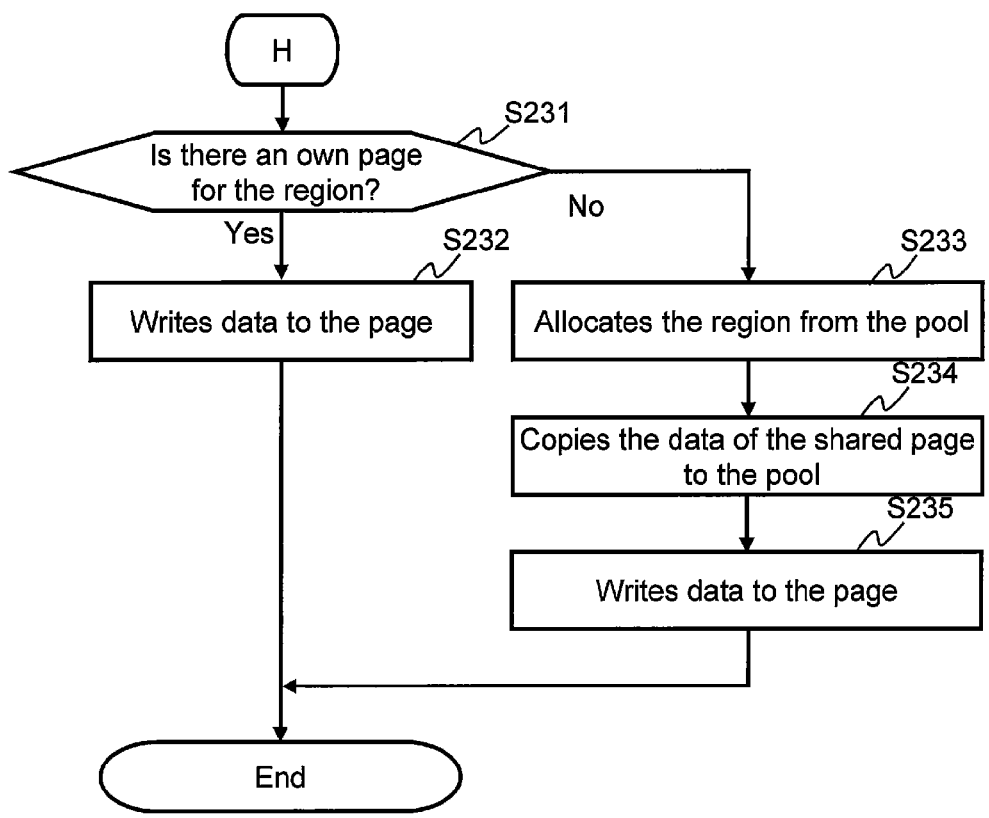
FIG. 28 is a second flowchart of an SVOL write processing in accordance with an embodiment of the present invention.

FIG. 28 is a second flowchart of an SVOL write processing in accordance with an embodiment of the present invention.

In the case in which the processing proceeds to the point H as shown in FIG. 28, the controller 11 of the storage apparatus 1 refers to the address management table 1181, and judges whether or not there is an own page for a region of the SVOL of the write target (step S231). In the case in which there is an own page (Yes for the step S231) as a result of the judgment, the controller 11 writes the write data to the own page, and transmits a response to the host 2 (step S232).

On the other hand, in the case in which there is not an own page (No for the step S231) as a result of the judgment, the controller 11 allocates a page as the own page from the pool 14 to the region of the SVOL that is corresponded to a region of the write target based on the difference region management table 1172, updates the address management table 1181 in accordance with the allocation (step S233), and copies data of the shared page of the corresponded region to the page that has been allocated (step S234). In the next place, the controller 11 copies the data of the write target to the own page, and transmits a response to the host 2 (step S235).

Figure 29:
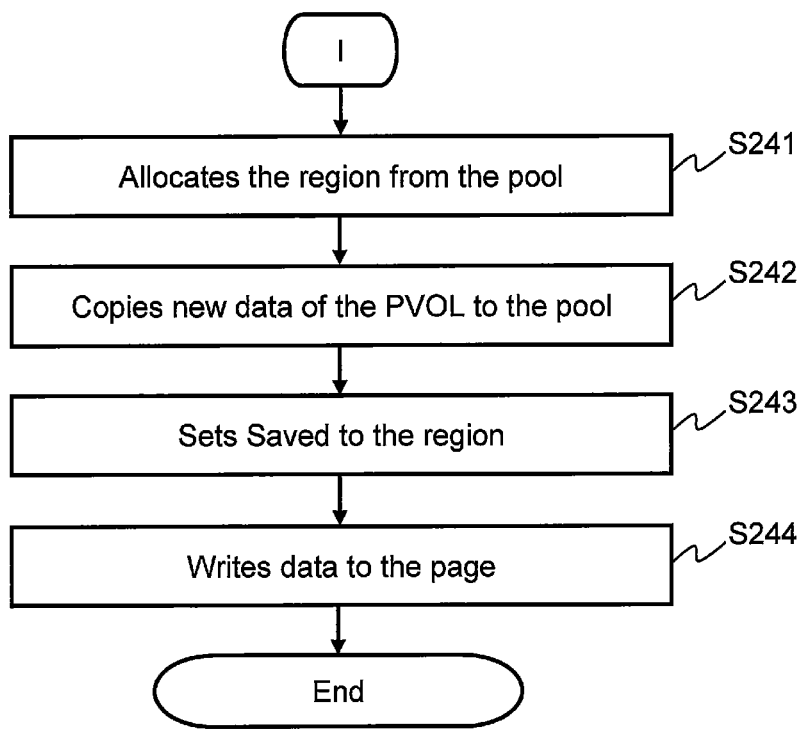
FIG. 29 is a third flowchart of an SVOL write processing in accordance with an embodiment of the present invention.

FIG. 29 is a third flowchart of an SVOL write processing in accordance with an embodiment of the present invention.

In the case in which the processing proceeds to the point I as shown in FIG. 29, the controller 11 allocates the page from the pool 14 to the region of the SVOL of the write target based on the difference region management table 1172, and updates the page management table 1182 in accordance with the allocation (step S241). In the next place, the controller 11 copies data of the PVOL of the cache region 121 that is corresponded to the region of the SVOL (data that configures the snapshot of the present generation) to a region that has been allocated (step S242), sets Saved to a save status of the corresponded region of the difference region management table 1172 (step S243), writes the write data to the page, and transmits a response to the host 2 (step S244).

Figure 30:
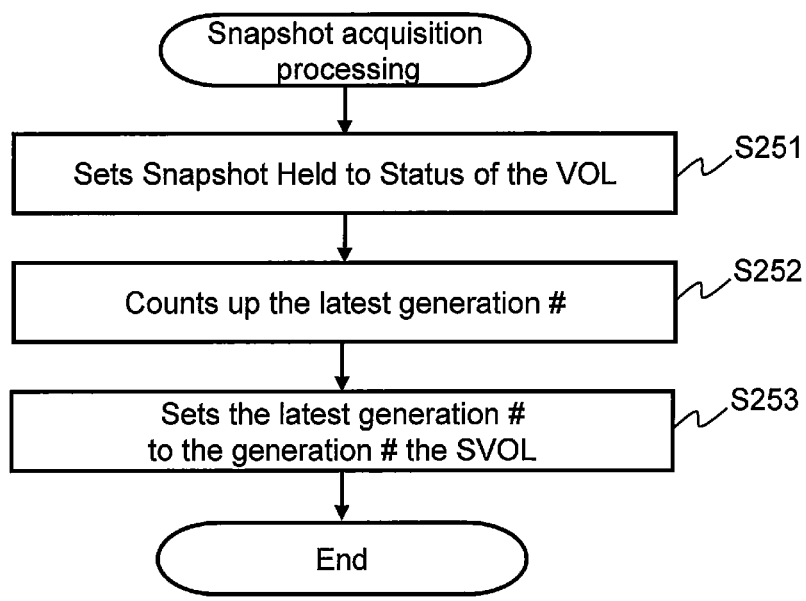
FIG. 30 is a flowchart of a Snapshot acquisition processing in accordance with an embodiment of the present invention.

FIG. 30 is a flowchart of a Snapshot acquisition processing in accordance with an embodiment of the present invention.

The Snapshot acquisition processing is executed at the time that has been set in advance or in the case in which a snapshot acquisition request is transmitted from the host 2 for instance.

The controller 11 sets the status that is corresponded to the SVOL for a management of the next snapshot of the PVOL of a snapshot acquisition target to Snapshot Held (step S251), counts up the corresponded latest generation # (step S252), and sets the latest generation # to the generation # of the SVOL (step S253) for the pair information management table 1171. In the present embodiment as described above, for the acquisition processing of the next snapshot, it is not necessary to execute a processing for saving data of a region of the PVOL, and an access to the PVOL can be executed in a short time.

Figure 31:
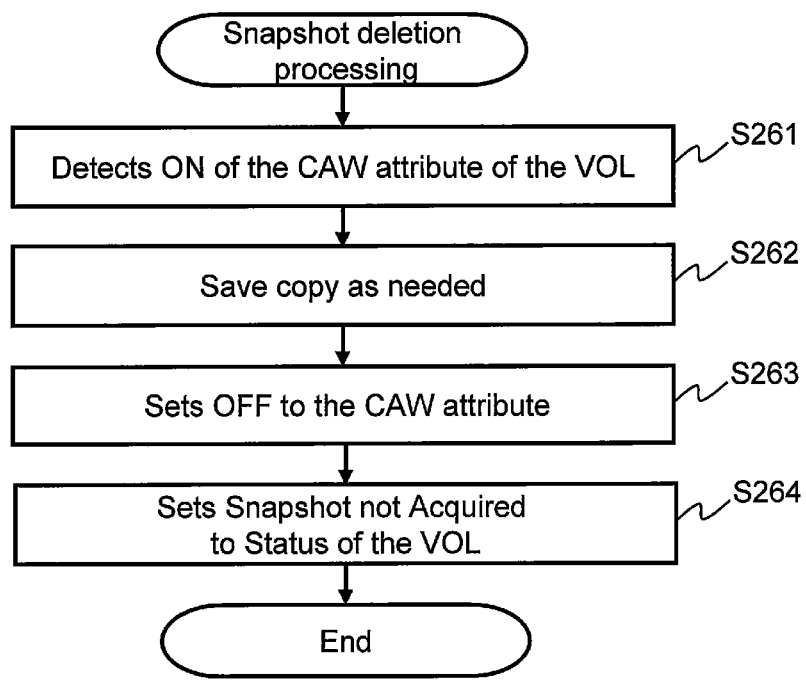
FIG. 31 is a flowchart of a Snapshot deletion processing in accordance with an embodiment of the present invention.

FIG. 31 is a flowchart of a Snapshot deletion processing in accordance with an embodiment of the present invention.

The Snapshot deletion processing is executed in the case in which a snapshot deletion request is transmitted from the host 2 for instance.

The controller 11 detects a region in which the CAW attribute is ON for the PVOL that is corresponded to the SVOL that is a snapshot deletion target from the difference region management table 1172 (step S261), and executes a save copy to the region in which the CAW attribute is ON as needed (step S262). More specifically, the controller 11 executes a save copy to the region of the SVOL that is referred to for data of a region that has been stored into the SVOL that is deleted and of a region that is referred to by other snapshot.

In the next place, the controller 11 sets the CAW attribute that is corresponded of the region of the difference region management table 1172 to OFF for the saved region of the PVOL (step S263), and sets Snapshot not Acquired to a status of the corresponded VOL of the pair information management table 1171 (step S264).

As described above, the computer system in accordance with the embodiment of the present invention can provide a technique for shortening a time of a processing in an acquisition of the next snapshot while maintaining an access response.

In the next place, a computer system in accordance with a modified example of the present invention will be described in the following. For the computer system in accordance with a modified example of the present invention, a region (a temporary region) that stores the write data in the cache region 121 on a temporary basis is further formed in the storage apparatus 1 of the computer system in accordance with the above embodiment.

Figure 32:
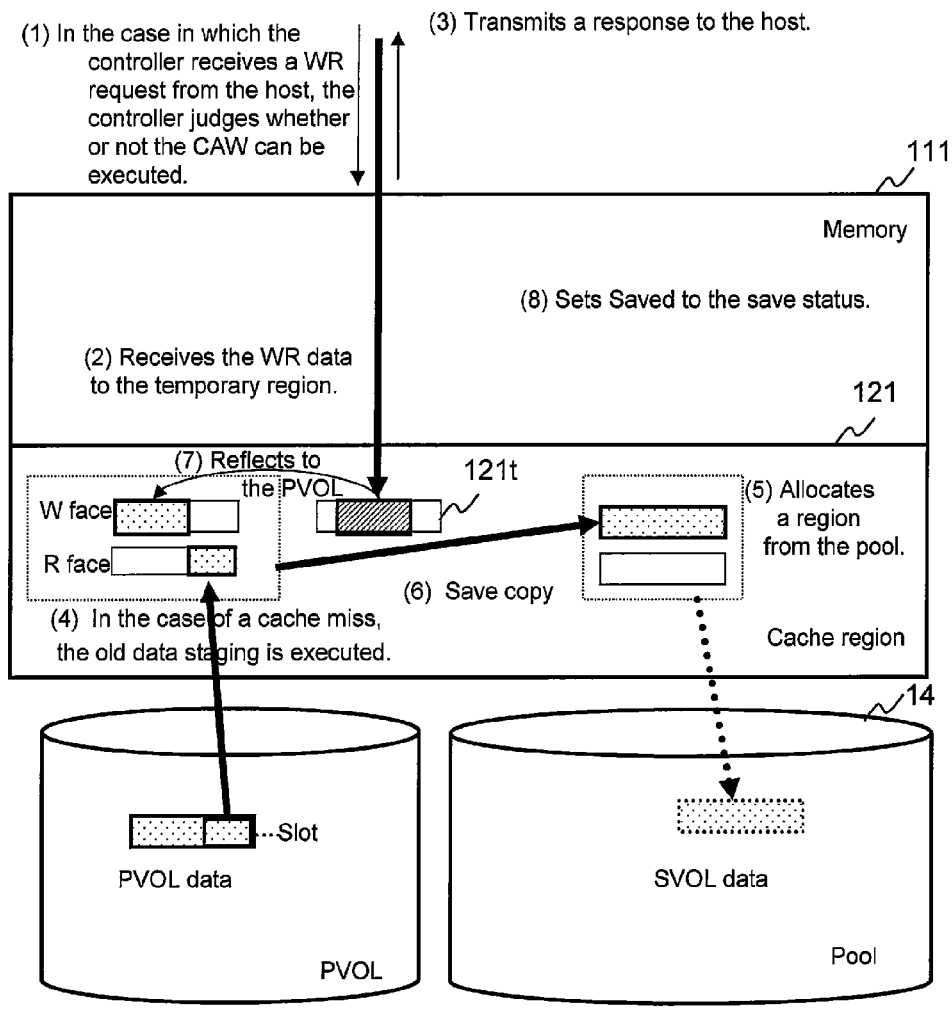
FIG. 32 is view for illustrating a summary of a part of a PVOL write processing in accordance with a modified example of the present invention.

FIG. 32 is view for illustrating a summary of a part of a PVOL write processing in accordance with a modified example of the present invention.

In the case in which the storage apparatus 1 receives a write (WR) request from the host 2, the storage apparatus 1 judges whether or not the CAW can be executed (see (1) in the figure). In the case in which a status is Snapshot Held and data of the corresponded region has been unsaved, the storage apparatus 1 receives data (WR data) of a write target, and writes the write data to a temporary region 121t of the cache region 121 (see (2) in the figure). The storage apparatus 1 then transmits a response to the write request to the host 2 (see (3) in the figure). By this process, a write response to the host 2 can be improved.

In the next place, the storage apparatus 1 executes a back-end processing in an asynchronous manner with the above, and detects a CAW attribute to the region in the PVOL (see (5) in the figure). In the case in which a CAW attribute is ON, the storage apparatus 1 judges whether or not data before an update of a region of a write target is cached to a read face (an R face) of the cache region in advance. In the case of a cache miss, the storage apparatus 1 executes the staging of a slot that includes the corresponded region of the PVOL, that is, reads data to the R face of the cache region 121 (see (4) in the figure). In the next place, the storage apparatus 1 allocates a region (a page) from the pool 14 as a corresponded region in the SVOL (see (5) in the figure), and saves and copies data that has been read to the R face of the cache region 121 to the region (see (6) in the figure). In the next place, the storage apparatus 1 reflects the write data that has been stored into the temporary region 121t of the cache region 121 to the cache region 121 of the corresponded region of the PVOL (see (7) in the figure), and sets Saved as a save status of a region of the difference region management table 1172 (see (8) in the figure).

In the next place, an operation of the storage apparatus in accordance with a modified example of the present invention will be described in the following.

Figure 33:
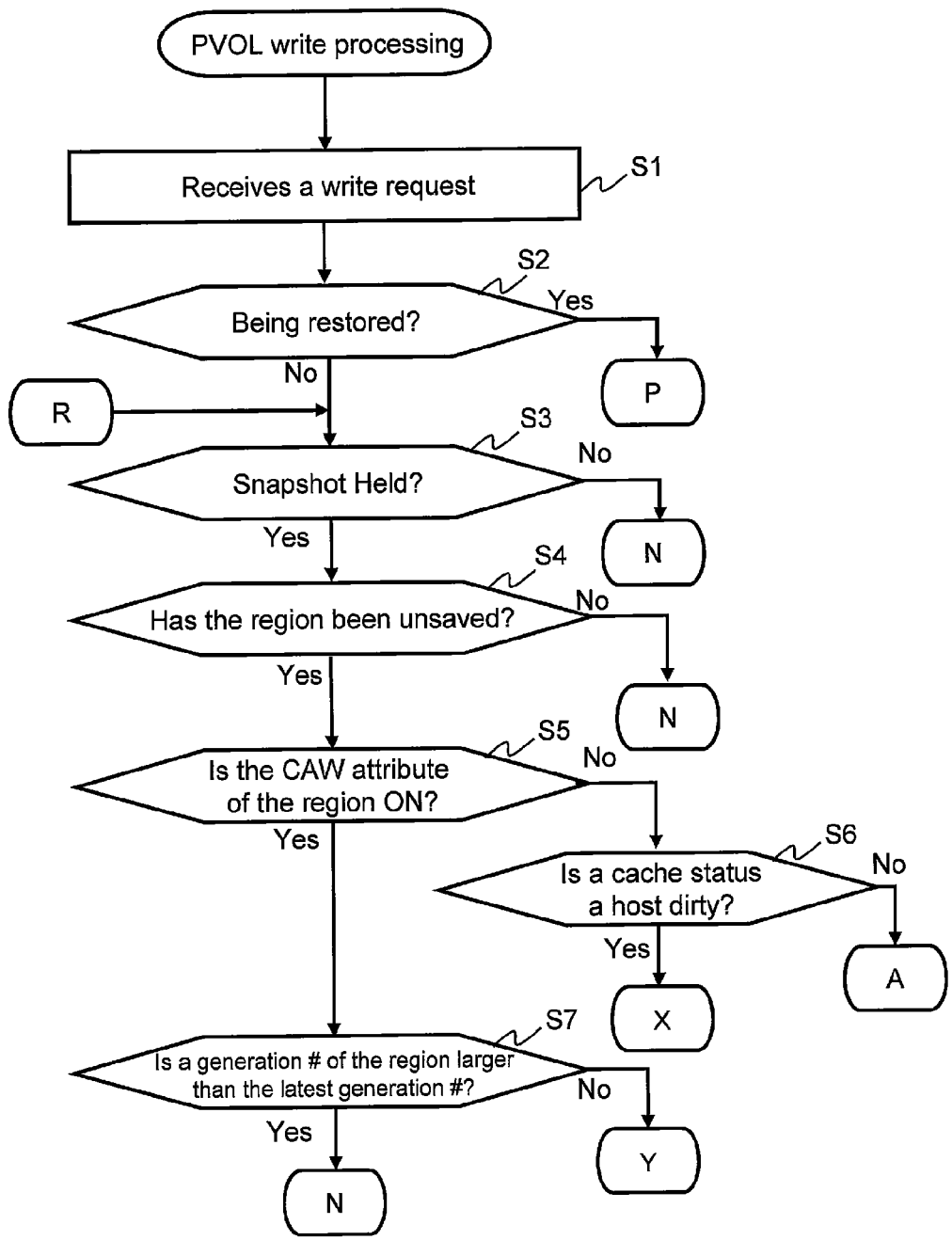
FIG. 33 is a first flowchart of a PVOL write processing in accordance with a modified example of the present invention.

FIG. 33 is a first flowchart of a PVOL write processing in accordance with a modified example of the present invention. Here, steps equivalent to those illustrated in the above embodiments are numerically numbered similarly and the difference from the PVOL write processing in accordance with the embodiments will be mainly described in the following for the PVOL write processing in accordance with the modified example.

Figure 34:
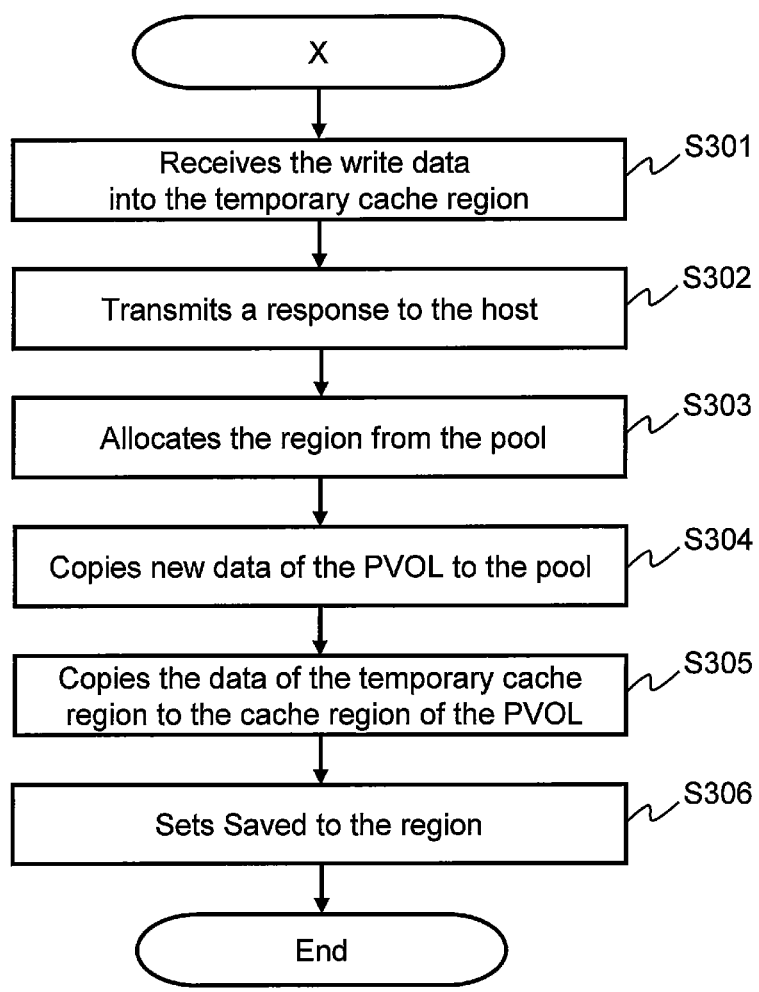
FIG. 34 is a second flowchart of a PVOL write processing in accordance with a modified example of the present invention.

For a PVOL write processing in accordance with a modified example of the present invention, in the case in which the controller 11 judges whether or not a cache status of the cache region is a host dirty in the step S6 and a cache status of the cache region is not a host dirty (No for the step S6), the controller 11 proceeds the processing to a point X (see FIG. 34).

Figure 35:
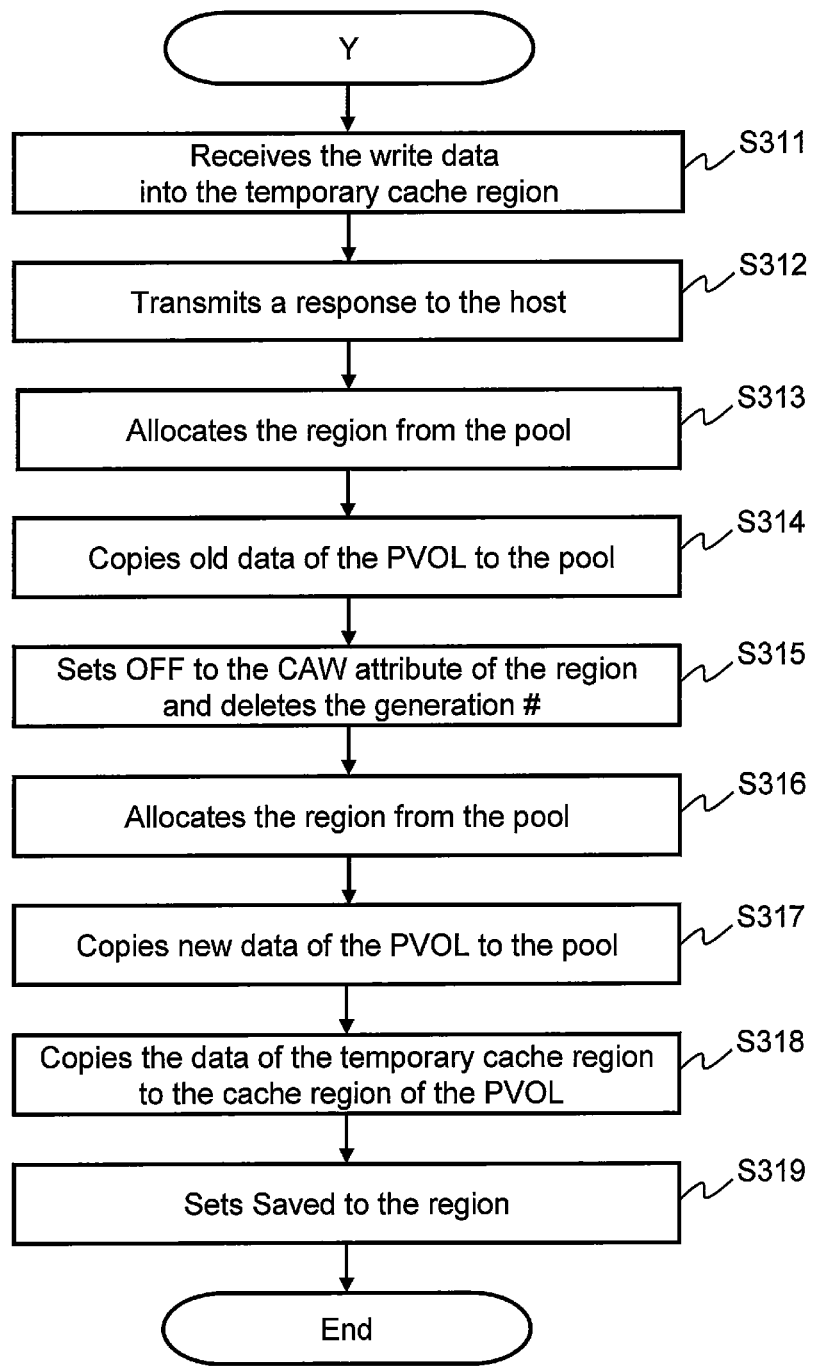
FIG. 35 is a third flowchart of a PVOL write processing in accordance with a modified example of the present invention.

Moreover, in the case in which the controller 11 judges whether or not a generation # of the region is larger than the latest generation # in the step S7 and a generation # of the region is equal to or less than the latest generation # (No for the step S7), the controller 11 proceeds the processing to a point Y (see FIG. 35).

FIG. 34 is a second flowchart of a PVOL write processing in accordance with a modified example of the present invention.

In the case in which the processing proceeds to the point X as shown in FIG. 34, the controller 11 stores the write data to the temporary region 121t of the cache region 121 (step S301), and transmits a response that is corresponded to the write request to the host 2 (step S302). By this process, a write response to the host 2 can be improved.

In the next place, the controller 11 identifies a generation # that is corresponded to a region of a PVOL of a write target based on the difference region management table 1172, identifies an SVOL of the generation # based on the pair information management table 1171, allocates a region from the pool 14 to the region of the SVOL that is corresponded to a region of the write target, and updates the page management table 1182 in accordance with the allocation (step S303). In the next place, the controller 11 copies data that is corresponded to the PVOL that has been stored into the cache region 121 to the page that has been allocated (step S304). In the case in which data that has been stored into the cache region 121 is only data of a part of a slot, the controller 11 reads data of the corresponded slot of the PVOL to the R face of the cache region 121, complements data of an insufficient part of the slot with data that has been read to the R face, and copies the data to the allocated page.

In the next place, the controller 11 copies data of the temporary region 121t to a region for the PVOL of the cache region 121 (step S305), and sets Saved to a save status of the corresponded region of the difference region management table 1172 (step S306).

FIG. 35 is a third flowchart of a PVOL write processing in accordance with a modified example of the present invention.

In the case in which the processing proceeds to the point Y as shown in FIG. 35, the controller 11 stores the write data to the temporary region 121t of the cache region 121 (step S311), and transmits a response that is corresponded to the write request to the host 2 (step S312). By this process, a write response to the host 2 can be improved.

The controller 11 identifies a generation # that is corresponded to a region of a PVOL of a write target based on the difference region management table 1172, identifies an SVOL of the generation #−1 based on the pair information management table 1171, allocates a region from the pool 14 to the region of the SVOL that is corresponded to a region of the write target, and updates the page management table 1182 in accordance with the allocation (step S313). In the next place, the controller 11 copies data of the corresponded region that has been stored into the PVOL (old data: data that configures a snapshot of the previous generation) to the page that has been allocated (step S314), sets the CAW attribute of the region that is corresponded of the difference region management table 1172 to OFF, and deletes the generation # (step S315).

In the next place, the controller 11 identifies a generation # that is corresponded to a region of a PVOL of a write target based on the difference region management table 1172, identifies an SVOL of the generation # based on the pair information management table 1171, allocates a page from the pool 14 to the region of the SVOL that is corresponded to a region of the write target, and updates the page management table 1182 in accordance with the allocation (step S316). In the next place, the controller 11 copies data that is to be written to the corresponded region of the PVOL that has been stored into the cache region 121 (data that configures the present snapshot) to the page that has been allocated (step S317). In the case in which data that has been stored into the cache region 121 is only data of a part of a slot, the controller 11 reads data of the corresponded slot of the PVOL to the R face of the cache region 121, complements data of an insufficient part of the slot with data that has been read to the R face, and copies the data to the allocated page.

In the next place, the controller 11 copies data of the temporary region 121t to a region for the PVOL of the cache region 121 (step S318), and sets Saved to a save status that is corresponded to the region of the difference region management table 1172 (step S319).

While the preferred embodiments in accordance with the present invention have been described above, the present invention is not restricted to the embodiments, and various changes, modifications, and functional additions can be thus made without departing from the scope of the present invention.

REFERENCE SIGNS LIST

1: Storage apparatus
11: Controller
111: Memory
112: CPU
121: Cache region
12: Disk apparatus
14: Pool

The invention claimed is:

1. A storage system communicably coupled to a host computer, the storage system comprising: a plurality of storage media; a memory region; a cache memory region; and a processor, wherein the plurality of storage media configures a pool having a plurality of pages, wherein the pool configured a plurality of logical volumes including a primary volume and at least one secondary volume, the primary volume is configured by a plurality of logical regions where data of the host computer is stored, and the at least one secondary volume is a logical volume configured by a plurality of virtual regions for holding at least one snapshot image of the primary volume corresponding to at least one snapshot acquisition point of time of the primary volume, wherein, in the case in which a virtual region of a write destination of data is not allocated to a page in the pool, a page is allocated to the virtual region of the write destination and the data is stored into the page allocated to the virtual region, wherein the cache memory region stores at least one data element that is to be written to one of the logical regions of the primary volume, wherein the memory region stores time relation information that indicates a time relationship of each data element that has been stored in logical regions of the primary volume and each data element that has been stored into the cache memory region and that is to be written to one of the logical regions and the at least one snapshot acquisition point of time of the primary volume, wherein the processor is configured to: (A) receive a write request from the host computer to the primary volume specifying a write destination of the primary volume, (B) judge whether or not a first data element that has been previously stored into the cache memory region and that is to be written to a logical region as the write destination of the primary volume corresponding to the write request is a snapshot configuration element that configures a snapshot image of the primary volume based on the time relation information for the first data element, (C) in the case in which the first data element is a snapshot configuration element, identify the time relation information corresponding to a data element stored in the logical region of the write destination of the first data element, save the snapshot configuration element in the cache memory region to the secondary volume for holding a snapshot image to which the snapshot configuration element belongs, and then store a second data element of the write request in the cache memory region, and (D) in the case in which the first data element is not a snapshot configuration element, store a second data element of the write request in the cache memory region wherein in (C), the processor is configured to identify a secondary volume holding the snapshot image of the logical region of the write destination of the first data element corresponding to a different time relation information than the identified time relation information, allocate a page from the pool to the virtual region of the second volume identified, and store the data element stored in the logical region of the write destination of the first data element into the page allocated.

2. A storage system according to claim 1, wherein the time relation information includes a generation number, that indicates a generation representing the snapshot acquisition point of time of the primary volume, for each of the data elements,
wherein a generation number for each data element that is written after a latest generation of a snapshot of the primary volume is a generation number that is one greater than the generation number of the latest generation, and
wherein, in the case in which a generation number of the data element that has been stored into the cache memory region is equal to or less than the latest generation of a snapshot of the primary volume in (B), the processor decides that the data element that has been stored into the cache memory region is a snapshot configuration element.

3. A storage system according to claim 2, wherein the processor is further configured to:
(F) after receiving the instruction for acquiring the snapshot of the primary volume, store a generation number that is one greater than the latest generation into the memory region as a new latest generation number, and
(G) store a generation number of the secondary volume that holds the snapshot image of the primary volume at a snapshot acquisition point of time corresponding to the instruction into the memory region as the new latest generation number.

4. A storage system according to claim 1, wherein:
in the case in which the processor receives a first write request from the host computer in (A) after acquiring the snapshot image, the processor stores the second data element that conforms to the write request into the cache memory region, and stores into the memory region a first value that indicates that a save is required as an attribute value that indicates whether or not it is necessary that a third data element in the logical region of the write destination of the first data element corresponding to the write request is saved to the secondary volume with the logical region of the write destination being associated therewith, and
the processor judges whether or not the first data element that has been stored into the cache memory region is a snapshot configuration element to the third data element corresponding to the first value in (B).

5. A storage system according to claim 4, wherein the processor is further configured to:
(H) in the case in which the third data element in the logical region of the write destination of the first data element corresponding to the write request is saved to the secondary volume, a second value that indicates that a save is not required as the attribute value that is corresponded to the logical region of the write destination is set in the memory region.

6. A storage system according to claim 5, wherein the processor is further configured to:
- (I) identify one of the logical regions to which the first value as the attribute value corresponds with at an arbitrary timing, and
- (J) save the third data element in the logical region that has been identified in (I) into a virtual region corresponding to the logical region that has been identified in (I) of the secondary volume that is configured to hold a snapshot image in which the third data element is a snapshot configuration element, and modifies the attribute value corresponding to the logical region that has been identified in (I) from the first value to the second value.

7. A storage system according to claim 4, wherein the processor is further configured to:
- (a) receive a read request from the host computer to the secondary volume specifying a read source of the secondary volume,
- (b) in the case in which a virtual region of the read source corresponding to the read request refers to the primary volume and the attribute value for a logical region corresponding to the read source virtual region is a first value, judge whether or not the first data element that has been stored into the cache memory region corresponds to after the snapshot image of the secondary volume is acquired based on the time relation information for the logical region corresponding to the virtual region of the read source,
- (c) in the case in which the first data element that has been stored into the cache memory region corresponds to after the snapshot image of the secondary volume is acquired, save the third data element that has been stored into the logical region that is to store the first data element to a virtual region corresponding to the logical region, read the third data element from the virtual region, and transmit the third data element to the host computer, and
- (d) in the case in which the first data element that has been stored into the cache memory region corresponds to before the snapshot image of the secondary volume is acquired, read the first data element that has been stored into the cache memory region and transmit the first data element to the host computer.

8. A storage system according to claim 4, wherein the processor is further configured to:
- (f) receive a write request from the host computer to the secondary volume,
- (g) in the case in which a virtual region of a write destination corresponding to the write request to the secondary volume that has been received in (f) refer to the primary volume and if the attribute value for a logical region of the primary volume corresponding to the virtual region of the write request to the secondary volume is a first value, judge whether or not the first data element that has been stored into the cache memory region corresponds to after a snapshot image of the secondary volume is acquired based on the time relation information for the logical region corresponding to the virtual region of the write,
- (h) in the case in which the first data element that has been stored into the cache memory region corresponds to after the snapshot image of the secondary volume is acquired, save the third data element that has been stored into the logical region corresponding to the virtual region of the write destination to the virtual region of the write destination and write a fourth data element of the write request to the virtual region of the write destination, and
- (i) in the case in which the first data element that has been stored into the cache memory region corresponds to before the snapshot image of the secondary volume is acquired, save the first data element that has been stored into the cache memory region to the virtual region of the write destination and write the fourth data element of the write request to the virtual region of the write destination.

9. A storage system according to claim 1, wherein the processor is further configured to:
- in the case in which the first data element that has been stored into the cache memory region is a snapshot configuration element, save a third data element in the logical region of the write destination of the first data element corresponding to the write request to a virtual region corresponding to the logical region of the write destination in the secondary volume for holding the snapshot image in which the first data element is the snapshot configuration element.

10. A storage system according to claim 1, wherein the processor is further configured to:
- in the case in which the logical region of the write destination is a target of a restore and a restore is not yet executed, after saving the first data element that has been stored into the logical region of the write destination and the second data element that has been stored into the cache memory region and that is to be written to the primary volume to the corresponding secondary volume, copy the data element in the virtual region corresponding to the logical region of the write destination to the logical region of the write destination in the primary volume.

11. A storage system according to claim 1, wherein the processor is further configured to:
- (P) receive a read request from the host computer that specifies the primary volume,
- (Q) in the case in which a logical region of a read source corresponding to the read request is a target of a restore and a restore is not yet executed, judge whether or not the first data element that has been stored into the cache memory region and that is to be written to the logical region of the read source is a snapshot configuration element based on the time relation information for the first data element,
- (R) in the case in which the first data element that has been stored into the cache memory region is a snapshot configuration element, save the first data element to the secondary volume for holding the snapshot image in which the first data element is the snapshot configuration element, save a third data element in the logical region of the read source to a virtual region corresponding to the logical region of the read source in the secondary volume for holding the snapshot image in which the third data element is a snapshot configuration element, then copy the third data element in the virtual region corresponding to the logical region of the read source in the secondary volume to the logical region of the read source in the primary volume, and transmit the third data element that has been copied to the logical region of the read source to the host computer, and
- (S) in the case in which the first data element that has been stored into the cache memory region is not a snapshot configuration element, copy the third data element in the virtual region corresponding to the logical region of the read source in the secondary volume to the logical region of the read source and transmit the third data element that has been copied to the logical region of the read source to the host computer.

12. A storage system according to claim 1, wherein the processor is further configured to:
after storing the second data element of the write request into the cache memory region, transmit a response to the write request to the host computer.

13. A storage system according to claim 1, wherein:
the memory region stores the time relation information for each data element that is to be written to the primary volume and that is stored into the cache memory region where the time relation information corresponds to region identification information that identifies a logical region of the primary volume to which each data element is to be written.

14. A storage system according to claim 1, wherein:
the cache memory region is provided with a temporary region that stores each data element of each write request on a temporary basis and a primary volume region that is a region separate from the temporary region,
the processor is further configured to:
store the second data element of the write request that has been received in (A) into the temporary region and transmits a response to the write request to the host computer,
save the snapshot configuration element of the cache memory region to the secondary volume in (C), and move the second data element of the write request from the temporary region to the primary volume region in (D).

15. A Storage control method comprising the steps of:
receiving a write request that specifies a primary volume that is a logical volume configured by a plurality of logical regions in which data of a host computer is stored; identifying a time relationship, based on time relation information that indicates a time relationship of each data element that has been stored in logical regions of the primary volume and each data element that has been stored into a cache memory region and that is to be written to one of the logical regions and at least one snapshot acquisition point of time of the primary volume, for a first data element that is to be written to a logical region on a write destination corresponding to the write request and that has been stored into the cache memory region; judging whether or not the first data element that has been stored into the cache memory region is a snapshot configuration element that configures a snapshot image of the primary volume based on the time relationship, in the case in which the first data element is a snapshot configuration element, identifying the time relation information corresponding to a data element stored in the logical region of the write destination of the first data element, saving the snapshot configuration element in the cache memory region to a secondary volume for holding a snapshot image to which the snapshot configuration element belongs from among one or more secondary volumes that correspond to the at least one snapshot acquisition point of time of the primary volume, and then storing the second data element of the write request into the cache memory region, and in the case in which the first data element is not the snapshot configuration element, storing the second data element of the write request into the cache memory region, further comprising the steps of: identifying a secondary volume holding the snapshot image of the logical region of the write destination of the first data element corresponding to different time relation information than the identified time relation information, and storing the data element stored in the logical region of the write destination of the first data element into the identified secondary volume.

* * * * *